(12) United States Patent
Chen et al.

(10) Patent No.: US 12,289,668 B2
(45) Date of Patent: *Apr. 29, 2025

(54) BLUETOOTH AUDIO BROADCASTING SYSTEM SUPPORTING BLUETOOTH LOW ENERGY AUDIO BROADCASTING OPERATIONS AND CAPABLE OF AVOIDING USER FROM MISSING EXTERNAL ALERT SIGNALS OR SPECIFIC SOUNDS

(71) Applicant: Realtek Semiconductor Corp., Hsinchu (TW)

(72) Inventors: Yi-Cheng Chen, Hsinchu (TW); Bi Wei, Suzhou (CN); Yu Hsuan Liu, Hsinchu (TW); Chia Chun Hung, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,349

(22) Filed: May 3, 2024

(65) Prior Publication Data

US 2024/0284307 A1     Aug. 22, 2024

Related U.S. Application Data

(60) Division of application No. 17/845,429, filed on Jun. 21, 2022, which is a continuation-in-part of
(Continued)

(30) Foreign Application Priority Data

Dec. 18, 2020 (CN) .......................... 202011510985.4
Nov. 19, 2021 (TW) ................................. 110143295

(51) Int. Cl.
*H04W 48/10*     (2009.01)
*G06F 3/16*     (2006.01)
*H04W 48/16*     (2009.01)

(52) U.S. Cl.
CPC ............ *H04W 48/10* (2013.01); *G06F 3/165* (2013.01); *H04W 48/16* (2013.01)

(58) Field of Classification Search
CPC ........ H04W 48/10; H04W 48/16; G06F 3/165
See application file for complete search history.

(56) References Cited

U.S. PATENT DOCUMENTS 10,224,019 B2    3/2019   Mitchell et al.
10,959,022 B1    3/2021   Baumbach
(Continued)

FOREIGN PATENT DOCUMENTS

CN     110351669 A     10/2019
CN     112970267 A     6/2021
(Continued)

OTHER PUBLICATIONS

Chinese Office Action and Search Report for Chinese Application No. 202111364400.7, dated Feb. 8, 2024, with partial English translation.
(Continued)

*Primary Examiner* — Olisa Anwah
(74) *Attorney, Agent, or Firm* — Birch, Stewart, Kolasch & Birch, LLP

(57) ABSTRACT

A Bluetooth audio broadcasting system includes: an audio broadcasting device arranged to operably broadcast BLE (Bluetooth Low Energy) audio packets; a first Bluetooth member device arranged to operably parse the BLE audio packets to acquire a predetermined audio data and to operably control a first audio playback circuit to playback the predetermined audio data; a second Bluetooth member
(Continued)

device arranged to operably parse the BLE audio packets to acquire the predetermined audio data and to operably control a second audio playback circuit to playback the predetermined audio data; and a host device arranged to operably generate and transmit a target control command to the first and second Bluetooth member devices when the host device receives an alert signal, or when a specific ambient sound occurs in the surrounding environment of the host device.

9 Claims, 12 Drawing Sheets

Related U.S. Application Data application No. 17/553,104, filed on Dec. 16, 2021, now abandoned.

(56) References Cited

U.S. PATENT DOCUMENTS

| | | |
|---|---|---|
| 11,184,721 B2 | 11/2021 | Millington et al. |
| 2015/0312858 A1 | 10/2015 | Kerai |
| 2016/0299739 A1 | 10/2016 | Song |
| 2017/0078836 A1 | 3/2017 | Song |
| 2017/0251295 A1 | 8/2017 | Pergament et al. |
| 2020/0073731 A1 | 3/2020 | Fish et al. |
| 2020/0280800 A1 | 9/2020 | Wilberding et al. |
| 2022/0103948 A1* | 3/2022 | Kumar ............... H04R 5/04 |
| 2022/0391165 A1 | 12/2022 | Lee et al. |

FOREIGN PATENT DOCUMENTS

| | | |
|---|---|---|
| WO | WO 2020/107491 A1 | 6/2020 |
| WO | WO 2021/096257 A1 | 5/2021 |

OTHER PUBLICATIONS

Chinese Office Action and Search Report for corresponding Chinese Application No. 202111361185.5, dated Dec. 18, 2023, with English translation.
Chinese Office Action and Search Report for corresponding Chinese Application No. 202111362433.8, dated Dec. 19, 2023 with English translation.
Taiwanese Notice of Allowance dated Jun. 19, 2023 for Application No. 111122939 with an English translation.
Taiwanese Office Action and Search Report dated Nov. 24, 2022 for Application No. 111122939 with an English translation.
Taiwanese Office Action and Search Report for Taiwanese Application No. 110143295, dated Feb. 22, 2022, with English translation.
Taiwanese Office Action and Search Report for Taiwanese Application No. 110143296, dated Feb. 22, 2022, with English translation.
Taiwanese Office Action and Search Report for Taiwanese Application No. 110143297, dated Feb. 22, 2022, with English translation.
Taiwanese Office Action and Search Report for Taiwanese Application No. 110143298, dated Feb. 22, 2022, with English translation.
U.S. Office Action for U.S. Appl. No. 17/552,878, dated Feb. 10, 2023.
U.S. Office Action for U.S. Appl. No. 17/553,055, dated May 22, 2023.
U.S. Office Action for U.S. Appl. No. 17/553,104, dated Jun. 12, 2023.
U.S. Office Action for U.S. Appl. No. 17/553,474, dated Jan. 19, 2023.
U.S. Office Action for U.S. Appl. No. 18/359,734, dated Apr. 10, 2024.
U.S. Office Action for U.S. Appl. No. 17/845,429, dated Nov. 25, 2024.
U.S. Office Action for U.S. Appl. No. 18/654,285, dated Nov. 26, 2024.
U.S. Office Action for U.S. Appl. No. 18/654,318, dated Nov. 29, 2024.
U.S. Office Action for U.S. Appl. No. 18/654,366, dated Dec. 6, 2024.
U.S. Office Action for U.S. Appl. No. 18/654,373, dated Dec. 6, 2024.
U.S. Office Action for U.S. Appl. No. 18/654,341, dated Nov. 29, 2024.
U.S. Office Action for U.S. Appl. No. 18/654,341, dated Jan. 10, 2025.
Taiwanese Office Action and Search Report for Taiwanese Application No. 112135642, dated Feb. 10, 2025, with English translation.
Taiwanese Office Action and Search Report for Taiwanese Application No. 112135646, dated Feb. 10, 2025, with English translation.
U.S. Office Action for U.S. Appl. No. 18/654,285, dated Feb. 27, 2025.
U.S. Office Action for U.S. Appl. No. 18/654,366, dated Feb. 28, 2025.
U.S. Office Action for U.S. Appl. No. 18/654,373, dated Feb. 27, 2025.
Taiwanese Office Action and Search Report for Taiwanese Application No. 112135643, dated Mar. 10, 2025, with English translation.
Taiwanese Office Action and Search Report for Taiwanese Application No. 112135644, dated Mar. 10, 2025, with English translation.
Taiwanese Office Action and Search Report for Taiwanese Application No. 112135645, dated Mar. 6, 2025, with English translation.
Taiwanese Office Action and Search Report for Taiwanese Application No. 112135647, dated Mar. 5, 2025, with English translation.

* cited by examiner

BLUETOOTH AUDIO BROADCASTING SYSTEM SUPPORTING BLUETOOTH LOW ENERGY AUDIO BROADCASTING OPERATIONS AND CAPABLE OF AVOIDING USER FROM MISSING EXTERNAL ALERT SIGNALS OR SPECIFIC SOUNDS

CROSS-REFERENCE TO RELATED APPLICATIONS

This application is a Divisional of co-pending U.S. patent application Ser. No. 17/845,429, filed on Jun. 21, 2022, which is a Continuation-In-Part of and claims the benefit of priority to U.S. patent application Ser. No. 17/553,104, filed on Dec. 16, 2021; which claims the benefit of priority to Patent Application No. 110143295, filed in Taiwan on Nov. 19, 2021, and also claims the benefit of priority to Patent Application No. 202011510985.4, filed in China on Dec. 18, 2020, the entirety of which is incorporated herein by reference for all purposes.

BACKGROUND

The disclosure generally relates to Bluetooth Technologies and, more particularly, to a Bluetooth audio broadcasting system and a related multi-member Bluetooth device supporting Bluetooth Low Energy (BLE) audio broadcasting operations and capable of avoiding the user from missing external alert signals or specific sounds.

There are two categories of Bluetooth technologies: Classic Bluetooth/Legacy Bluetooth technology and BLE (Bluetooth Low Energy) technology. The BLE technology is incompatible (or not completely compatible) with the Classic Bluetooth/Legacy Bluetooth technology, but the two technologies can coexist in the same Bluetooth device or the same Bluetooth chip. In other words, a single Bluetooth device or a single Bluetooth chip may be designed to support both the BLE technology and the Classic Bluetooth/Legacy Bluetooth technology, or may be designed to support only one category of the Bluetooth communication standards.

The newly launched Bluetooth LE Audio (BLE Audio) technology (hereinafter referred to as the BLE Audio technology) based on Bluetooth Core Specification Version 5.2 is a significant update to the technical specifications of audio transmission over the past twenty years of development of Bluetooth technologies. The main advantage of the BLE Audio technology is that the BLE Audio technology can transmit audio with higher quality while significantly reducing power consumption. In addition, the BLE Audio technology also utilizes a new mechanism called Broadcast Isochronous Stream (BIS) to conduct audio broadcasting operations. Utilizing a multi-member Bluetooth device to receive and playback audio broadcasting contents adopting the BLE Audio technology is one of the main development directions of future Bluetooth-related applications. The aforementioned multi-member Bluetooth device refers to a Bluetooth device formed by multiple Bluetooth circuits cooperating with each other, such as, a pair of Bluetooth earphones, a group of Bluetooth speakers, or the like.

It is well known that the BLE Audio technology does not specify how to flexibly adjust the audio volume of the audio receiving terminal when conducting audio broadcasting by using BIS mechanism. Of course, the BLE Audio technology does not specify how to synchronously adjust the audio volume of different Bluetooth member devices in the multi-member Bluetooth device when conducting audio broadcasting by using BIS mechanism. It is predictable that certain problems may be occurred when realizing audio broadcasting with the BLE Audio technology. For example, an audio broadcasting with unpredictable audio volume may cause discomfort or displeasure to some users, and even some users may be frightened by receiving sudden and loud audio broadcasting. Moreover, different users have different sensitivity and tolerance to the audio volume, and thus a single audio volume configuration is apparently unable to meet the requirements of different users at the same time.

Therefore, when utilizing the multi-member Bluetooth device to receive and playback the audio broadcasting adopting the BLE Audio technology, if the audio volume of different Bluetooth member devices in the multi-member Bluetooth device cannot be flexibly and synchronously adjusted, it may severely hinder the development prospects of the BLE Audio technology in the audio broadcasting applications.

On the other hand, when the user listens to the audio broadcast played by the multi-member Bluetooth device, the user's attention to the external sound will inevitably decrease, and sometimes the user may not notice the external sound at all. At this time, if an emergency event (for example, an air raid, fire, tsunami, etc.) suddenly occurs, the user may fall into a dangerous situation or delay responding to the emergency event due to not hearing the external alert.

SUMMARY

An example embodiment of a Bluetooth audio broadcasting system is disclosed, comprising: an audio broadcasting device (150) arranged to operably broadcast one or more Bluetooth LE audio packets through a Broadcast Isochronous Stream logical transport; a first Bluetooth member device comprising: a first Bluetooth communication circuit arranged to operably receive the one or more Bluetooth LE audio packets; a first audio processing circuit; and a first control circuit, coupled with the first Bluetooth communication circuit and the first audio processing circuit, and arranged to operably parse the one or more BLE audio packets received by the first Bluetooth communication circuit to acquire a predetermined audio data, and to operably instruct the first audio processing circuit to control a first audio playback circuit to playback the predetermined audio data; a second Bluetooth member device comprising: a second Bluetooth communication circuit arranged to operably receive the one or more Bluetooth LE audio packets; a second audio processing circuit; and a second control circuit, coupled with the second Bluetooth communication circuit and the second audio processing circuit, and arranged to operably parse the one or more BLE audio packets received by the second Bluetooth communication circuit to acquire the predetermined audio data, and to operably instruct the second audio processing circuit to control a second audio playback circuit to playback the predetermined audio data; and a host device arranged to operably generate and transmit a target control command to the first Bluetooth member device and the second Bluetooth member device when the host device receives an alert signal, or when a specific ambient sound occurs in a surrounding environment of the host device; wherein the first Bluetooth communication circuit is further arranged to operably receive the target control command, and the first control circuit is further arranged to operably control the first audio processing circuit to reduce an audio volume of the first audio playback circuit to be lower than a predetermined threshold according to the target control command; wherein the second Bluetooth communication circuit is further arranged to operably receive the target control command, and the second control circuit is further arranged to operably control the second audio processing circuit to reduce an audio volume of the second audio playback circuit to be lower than the predetermined threshold according to the target control command.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
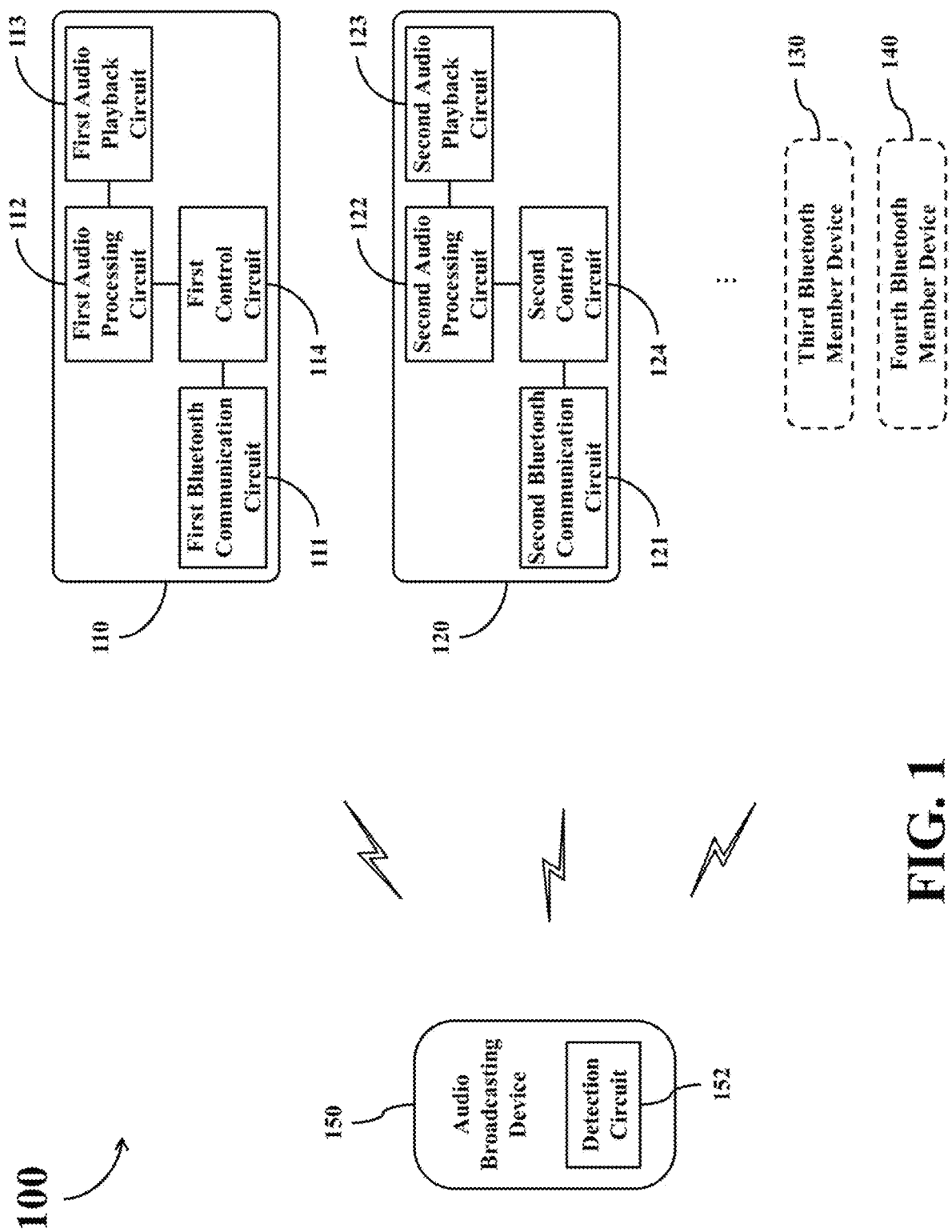
FIG. 1 shows a simplified functional block diagram of a Bluetooth audio broadcasting system according to a first embodiment of the present disclosure.

FIG. 1 shows a simplified functional block diagram of a Bluetooth audio broadcasting system 100 according to a first embodiment of the present disclosure. The Bluetooth audio broadcasting system 100 comprises multiple Bluetooth member devices capable of receiving audio broadcasting and an audio broadcasting device 150 for broadcasting audio data. The audio broadcasting device 150 is arranged to operably adopt Bluetooth LE Audio (BLE Audio) technology (hereinafter referred to as BLE Audio technology) specified by the Bluetooth Core Specification Version 5.2 or newer versions to broadcast audio data of various contents. For example, the aforementioned audio data may be flight information in the airport, schedule reminders in the train station or the high-speed rail station, story sounds in the movie theater, voice information in the gymnasium, guiding voice in the museum, introduction voice in the exhibition, voice translation in the auditorium, music or voice data selected by the user, multi-channel audio provided by the TV, contents of the teacher in the classroom, other types of audio content, or the like.

Each of the multiple Bluetooth member devices in the Bluetooth audio broadcasting system 100 supports the BLE technology specified by the Bluetooth Core Specification Version 5.2 or newer versions, and can receive and playback the audio data broadcasted by the audio broadcasting device 150. In practice, the Bluetooth audio broadcasting system 100 may comprises two or more than two Bluetooth member devices. For the convenience of description, only four exemplary Bluetooth member devices are illustrated in the embodiment of FIG. 1, which respectively are a first Bluetooth member device 110, a second Bluetooth member device, 120, a third Bluetooth member device 130, and a fourth Bluetooth member device 140.

In practical applications, the aforementioned first Bluetooth member device 110, second Bluetooth member device 120, third Bluetooth member device 130, and fourth Bluetooth member device 140 may collectively form a multi-member Bluetooth device, such as a group of multi-channel Bluetooth speakers. In this situation, the first Bluetooth member device 110, the second Bluetooth member device 120, the third Bluetooth member device 130, and the fourth Bluetooth member device 140 may adopt various approaches complying with the Bluetooth communication standard to establish a Bluetooth piconet, and may transmit various commands or data through the Bluetooth piconet. Alternatively, the first Bluetooth member device 110, the second Bluetooth member device 120, the third Bluetooth member device 130, and the fourth Bluetooth member device 140 may collectively form a coordinate set complying with various Bluetooth communication standards.

Alternatively, the aforementioned first Bluetooth member device 110, second Bluetooth member device 120, third Bluetooth member device 130, and fourth Bluetooth member device 140 may respectively belong to different multi-member Bluetooth devices. For example, the aforementioned first Bluetooth member device 110 and second Bluetooth member device 120 may collectively form a first multi-member Bluetooth device (e.g., a pair of Bluetooth earphones), and the aforementioned third Bluetooth member device 130 and fourth Bluetooth member device 140 may collectively form a second multi-member Bluetooth device (e.g., another pair of Bluetooth earphones). In this situation, the first Bluetooth member device 110 and the second Bluetooth member device 120 may adopt various approaches complying with the Bluetooth communication standard to establish a first Bluetooth piconet, and may transmit various commands or data through the first Bluetooth piconet. On the other hand, the third Bluetooth member device 130 and the fourth Bluetooth member device 140 may adopt various approaches complying with the Bluetooth communication standard to establish a second Bluetooth piconet, and may transmit various commands or data through the second Bluetooth piconet. Alternatively, the first Bluetooth member device 110 and the second Bluetooth member device 120 may collectively form a first coordinate set complying with various Bluetooth communication standards, and the third Bluetooth member device 130 and the fourth Bluetooth member device 140 may collectively form a second coordinate set complying with various Bluetooth communication standards.

In the embodiment of FIG. 1, the first Bluetooth member device 110 comprises a first Bluetooth communication circuit 111, a first audio processing circuit 112, a first audio playback circuit 113, and a first control circuit 114. Similarly, the second Bluetooth member device 120 comprises a second Bluetooth communication circuit 121, a second audio processing circuit 122, a second audio playback circuit 123, and a second control circuit 124.

In the first Bluetooth member device 110, the first Bluetooth communication circuit 111 is arranged to operably conduct Bluetooth communication to receive the audio data broadcasted by the audio broadcasting device 150 by adopting the BLE Audio technology. The first audio processing circuit 112 is coupled with the first audio playback circuit 113, and arranged to operably process the audio data transmitted from the audio broadcasting device 150 (e.g., encoding or decoding the audio data and/or conducting data format conversion) and to operably control the first audio playback circuit 113 to playback the audio data. The first control circuit 114 is coupled with the first Bluetooth communication circuit 111 and the first audio processing circuit 112, and arranged to operably parse the Bluetooth packets received by the first Bluetooth communication circuit 111 to acquire related information or commands and to operably control the operation of the first audio processing circuit 112.

In some embodiments, the first control circuit 114 is further arranged to operably control the first Bluetooth member device 110 to act as a Bluetooth Central in a Bluetooth piconet and to operably modify a clock signal utilized by the first Bluetooth member device 110, so as to synchronize a piconet clock shared by the first Bluetooth member device 110 and other Bluetooth devices.

The first control circuit 114 may communicate with other Bluetooth devices through the first Bluetooth communication circuit 111. The first control circuit 114 may further utilize the first audio processing circuit 112 to process the audio data transmitted from the audio broadcasting device 150 and may instruct the first audio processing circuit 112 to control the first audio playback circuit 113 to playback the audio data.

In the second Bluetooth member device 120, the second Bluetooth communication circuit 121 is arranged to operably conduct Bluetooth communication to receive the audio data broadcasted by the audio broadcasting device 150 by adopting the BLE Audio technology. The second audio processing circuit 122 is coupled with the second audio playback circuit 123, and arranged to operably process the audio data transmitted from the audio broadcasting device 150 (e.g., encoding or decoding the audio data and/or conducting data format conversion) and to operably control the second audio playback circuit 123 to playback the audio data. The second control circuit 124 is coupled with the second Bluetooth communication circuit 121 and the second audio processing circuit 122, and arranged to operably parse the Bluetooth packets received by the second Bluetooth communication circuit 121 to acquire related information or commands and to operably control the operation of the second audio processing circuit 122. In addition, the second control circuit 124 is further arranged to operably modify a clock signal utilized by the second Bluetooth member device 120, so as to synchronize a piconet clock shared by the second Bluetooth member device 120 and other Bluetooth devices.

In this embodiment, the second control circuit 124 is further arranged to operably control the second Bluetooth member device 120 to act as a Bluetooth Peripheral in the aforementioned Bluetooth piconet and to operably modify the clock signal utilized by the second Bluetooth member device 120, so as to synchronize the piconet clock shared by the second Bluetooth member device 120 and the first Bluetooth member device 110.

The second control circuit 124 may communicate with other Bluetooth devices through the second Bluetooth communication circuit 121. The second control circuit 124 may also utilize the second audio processing circuit 122 to process the audio data transmitted from the audio broadcasting device 150 and may instruct the second audio processing circuit 122 to control the second audio playback circuit 123 to playback the audio data.

In practice, the aforementioned first Bluetooth communication circuit 111 and second Bluetooth communication circuit 121 may be realized with appropriate Bluetooth transmission circuits supporting the Bluetooth communication protocol of the Bluetooth Core Specification Version 5.2 or a newer version. The first audio processing circuit 112 and the second audio processing circuit 122 may be realized with digital computing circuits, microprocessors, Application Specific Integrated Circuits (ASICs), or digital-to-analog converters (DACs) capable of conducting various encoding/decoding processing and/or data format conversion on the audio data. The first audio playback circuit 113 and the second audio playback circuit 123 may be realized with various appropriate circuits capable of receiving and playbacking the audio data, such as various types of speakers. The first control circuit 114 and the second control circuit 124 may be realized with various packet processing circuits, digital computing circuits, microprocessors, or ASICs having appropriate computing ability and capable of parsing and generating Bluetooth packets.

In some embodiments, the aforementioned first Bluetooth communication circuit 111 and second Bluetooth communication circuit 121 may be realized with appropriate Bluetooth transmission circuits that also support the Bluetooth communication protocol of earlier Bluetooth versions (e.g., Bluetooth 2.0, Bluetooth 3.0, Bluetooth 4.0, Bluetooth 4.2, or the like). In this situation, the aforementioned first control circuit 114 and second control circuit 124 should be designed to be able to parse and generate Bluetooth packets defined by the Bluetooth communication protocol of earlier Bluetooth versions.

Furthermore, different functional blocks of the aforementioned first Bluetooth member device 110 may be realized with separate circuits or may be integrated into a single Bluetooth controller IC or a single wearable Bluetooth device (e.g., a Bluetooth earphone). In addition, if necessary, the first Bluetooth communication circuit 111 may be coupled with additional antenna devices (not shown in the figures). Similarly, different functional blocks of the aforementioned second Bluetooth member device 120 may be realized with separate circuits or may be integrated into a single Bluetooth controller IC or a single wearable Bluetooth device (e.g., a Bluetooth earphone). In addition, if necessary, the second Bluetooth communication circuit 121 may be coupled with additional antenna devices (not shown in the figures).

In some embodiments, the aforementioned first audio processing circuit 112 and second audio processing circuit 122 may be respectively integrated into the aforementioned first control circuit 114 and the second control circuit 124.

In other words, the aforementioned first audio processing circuit 112 and first control circuit 114 may be realized with separate circuits or may be realized with a same circuit. Similarly, the aforementioned second audio processing circuit 122 and second control circuit 124 may be realized with separate circuits or may be realized with a same circuit.

The main circuit structure and implementation of other Bluetooth devices in the Bluetooth audio broadcasting system 100 are similar to the aforementioned first Bluetooth member device 110 or second Bluetooth member device 120, but different additional circuit components may be configured in different Bluetooth member devices, and the circuit structure of all Bluetooth member devices are not limited to be exactly identical.

As described previously, the audio broadcasting device 150 may adopt the BLE Audio technology specified by the Bluetooth Core Specification Version 5.2 or newer versions to broadcast various audio data. In operations, the audio broadcasting device 150 may broadcast one or more Bluetooth LE (BLE) audio packets containing audio data through a Broadcast Isochronous Stream (BIS) logical transport (hereinafter referred to as BIS logical transport).

In practice, the aforementioned audio broadcasting device 150 may be realized with various suitable circuits or devices that support the Bluetooth communication protocol of the Bluetooth Core Specification Version 5.2 or a newer version and capable of utilizing the BLE Audio technology to broadcast the audio data. For example, the audio broadcasting device 150 may be realized with an audio broadcast system, a voice guidance system, a voice broadcasting system, a desktop computer, a laptop computer, a tablet computer, a mobile communication device (e.g., a mobile phone), a wearable device, a vehicular audio system, a Bluetooth smart speaker, or the like.

However, the BLE Audio technology introduced by the Bluetooth Core Specification Version 5.2 does not specify how an audio source terminal adjusts the audio volume of the audio receiving terminals during the period at which audio source terminal conducts the audio broadcasting utilizing the BIS logical transport, nor does it require the audio source terminal to adjust the audio volume of the audio receiving terminals. Therefore, certain problems may be occurred when conducting audio broadcasting by adopting the BLE Audio technology. For example, an audio broadcasting with unpredictable audio volume may cause discomfort or displeasure to some users, and even some users may be frightened by receiving sudden and loud audio broadcasting.

In order to solve the blind spot of the existing BLE Audio technology of the Bluetooth Core Specification Version 5.2 in terms of audio broadcasting applications, the previously disclosed Bluetooth audio broadcasting system 100 adopts a special mechanism to broadcast the audio data.

Figure 2:
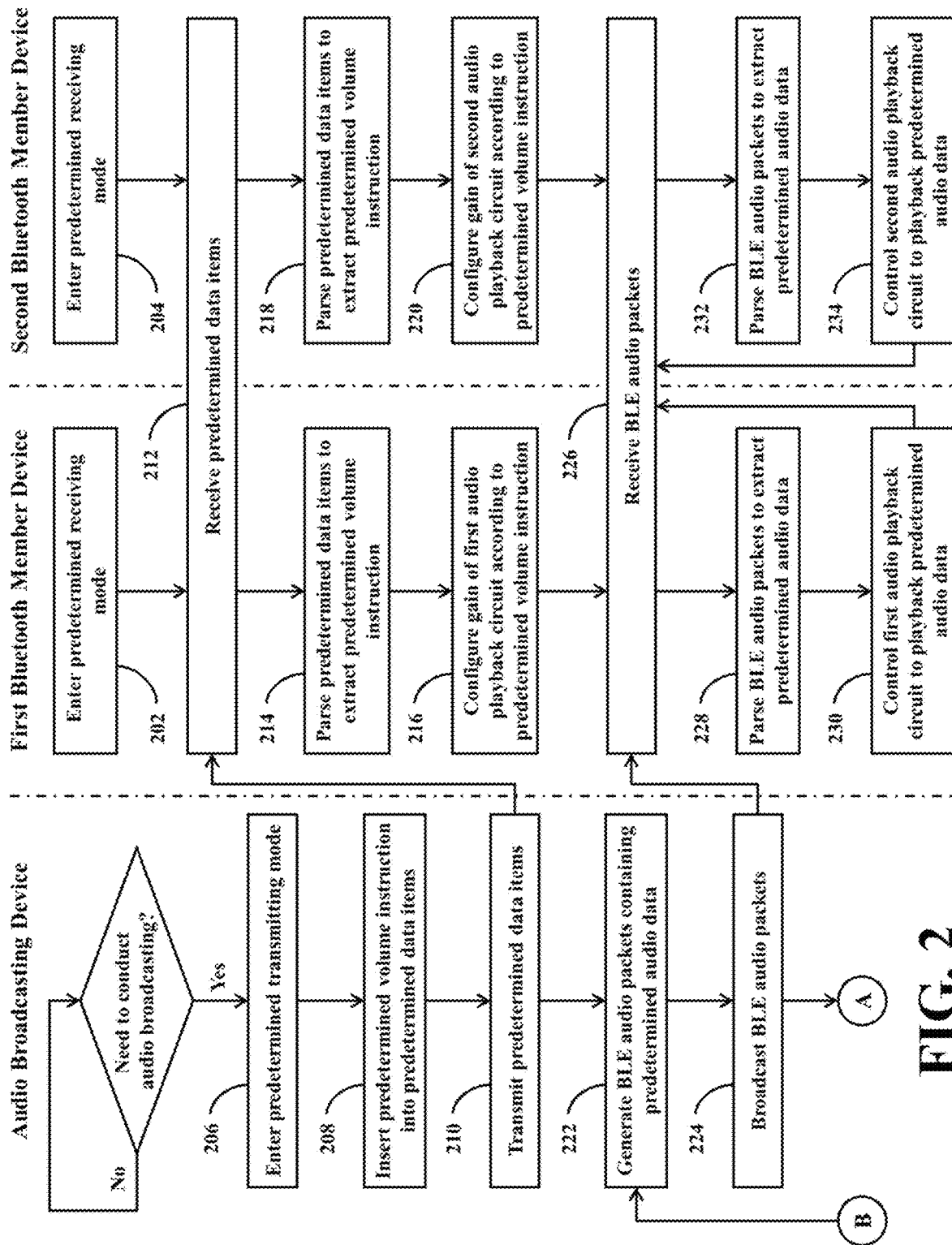
FIG. 2 through FIG. 3 collectively show a simplified flowchart of a method for conducting audio broadcasting by utilizing BLE Audio technology according to a first embodiment of the present disclosure.
Figure 3:
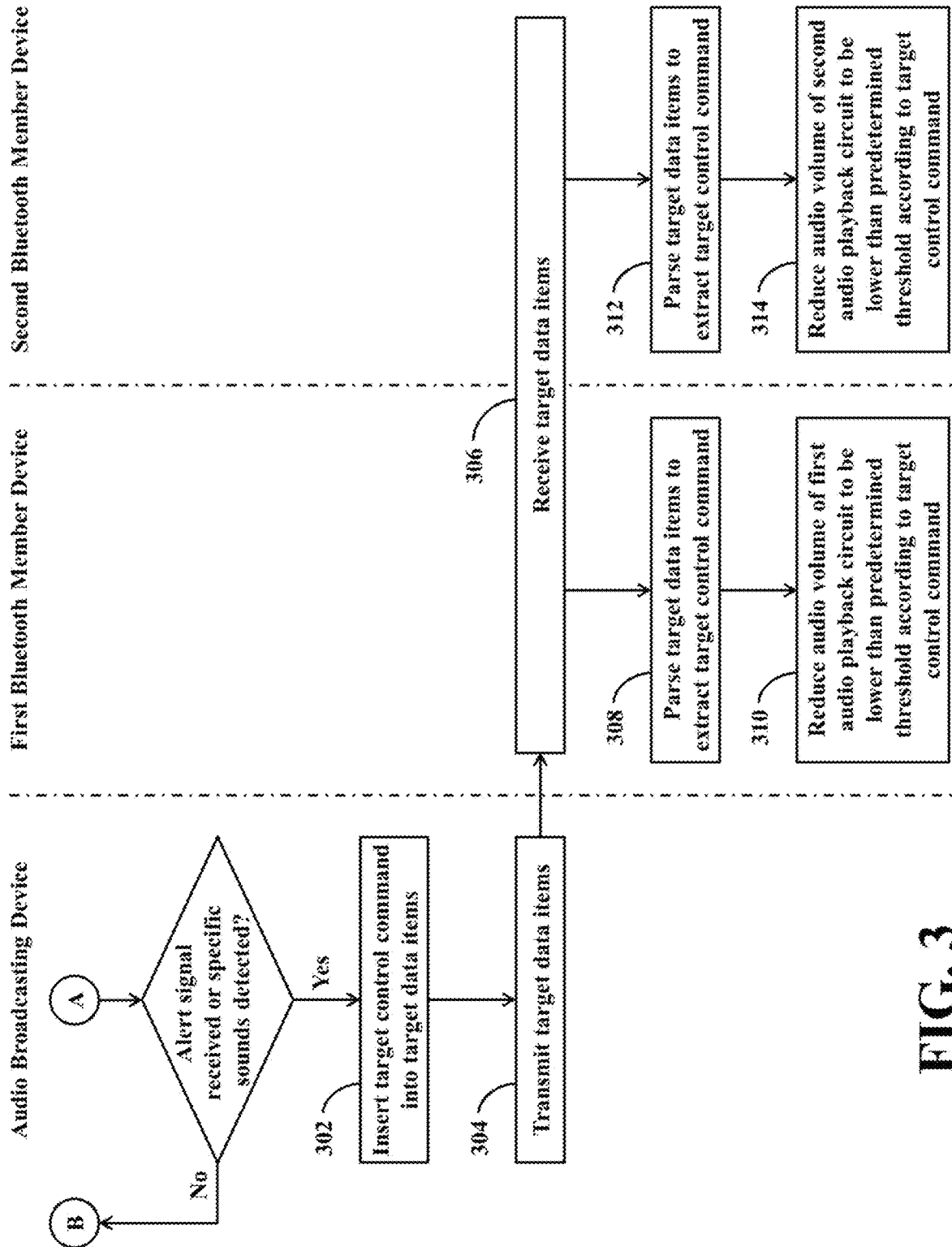

The operations of the Bluetooth audio broadcasting system 100 will be further described below by reference to FIG. 2 and FIG. 3. FIG. 2 and FIG. 3 collectively show a simplified flowchart of a method for conducting audio broadcasting by utilizing the BLE Audio technology according to a first embodiment of the present disclosure.

In the flowchart of FIG. 2 and FIG. 3, operations within a column under the name of a specific device are operations to be performed by the specific device. For example, operations within a column under the label "audio broadcasting device" are operations to be performed by the audio broadcasting device 150; operations within a column under the label "first Bluetooth member device" are operations to be performed by the first Bluetooth member device 110; operations within a column under the label "second Bluetooth member device" are operations to be performed by the second Bluetooth member device 120. The same analogous arrangement also applies to the subsequent flowcharts.

When the user wants to utilize the first Bluetooth member device 110 and the second Bluetooth member device 120 to receive an audio broadcasting, the first Bluetooth member device 110 may perform the operation 202 of FIG. 2, and the second Bluetooth member device 120 may perform operation 204 of FIG. 2.

In the operation 202, the first control circuit 114 may control the first Bluetooth communication circuit 111 to enter a predetermined receiving mode.

In the operation 204, the second control circuit 124 may control the second Bluetooth communication circuit 121 to enter the aforementioned predetermined receiving mode.

The aforementioned predetermined receiving mode refers to various operation modes capable of receiving various Bluetooth advertising packets, various BIS protocol data units (PDUs) (hereinafter referred to as BIS PDUs), and/or various Broadcast Isochronous Group (BIG) protocol data units (hereinafter referred to as BIG PDUs).

For example, the aforementioned predetermined receiving mode may be a LE Extended Passive Scan mode, a LE Extended Active Scan mode, a LE Extended Initiator mode, or a Periodic Scanning mode capable of receiving various Bluetooth advertising packets. For another example, the aforementioned predetermined receiving mode may be an operation mode capable of receiving various PDUs through the BIS logical transport and/or receiving various PDUs through a Broadcast Isochronous Group logical transport (hereinafter referred to as BIG logical transport), such as a Periodic Synchronization mode, a BIG Synchronization mode, or the like. Alternatively, the aforementioned predetermined receiving mode may be a combination of the aforementioned various operation modes.

As shown in FIG. 2, when the audio broadcasting device 150 needs to conduct the audio broadcasting, the audio broadcasting device 150 may perform operation 206 of FIG. 2.

In the operation 206, the audio broadcasting device 150 may enter a predetermined transmitting mode. The aforementioned predetermined transmitting mode refers to various operation modes capable of transmitting various Bluetooth advertising packets, various BIS PDUs, and/or various BIG PDUs.

For example, the aforementioned predetermined transmitting mode may be an Advertising mode, a Scannable mode, a Connectable mode, a Non-connectable mode, a Non-Scannable mode, a Periodic Advertising mode, a LE Extended Advertising mode, or a LE Periodic Advertising mode. For another example, the aforementioned predetermined transmitting mode may be a Broadcast Isochronous Broadcasting mode or a Broadcast Isochronous Synchronization mode capable of transmitting various BIS PDUs through the BIS logical transport and/or transmitting various BIG PDUs through the BIG logical transport. Alternatively, the aforementioned predetermined transmitting mode may be a combination of the aforementioned various operation modes.

In operation 208, the audio broadcasting device 150 may insert a predetermined volume instruction corresponding to a predetermined volume into one or more predetermined data items. The audio broadcasting device 150 may configure the aforementioned predetermined volume to a volume that is comfortable and not too loud for most people (e.g., about 45~60 dB), and may utilize various suitable data formats, index values, or values to indicate the aforementioned predetermined volume. In operations, the audio broadcasting device 150 may insert the predetermined volume instruction into a single or multiple specific fields of a single predetermined data item, or may separately insert the predetermined volume instruction into the specific fields of multiple predetermined data items. In some embodiments, in addition to the predetermined volume instruction, the audio broadcasting device 150 may further insert a Bluetooth address of the audio broadcasting device 150 and/or an indication message indicating that the audio broadcasting device 150 is about to start the audio broadcasting into a single or multiple specific fields of a single predetermined data item. Alternatively, the audio broadcasting device 150 may further insert the above Bluetooth address and/or above indication message into specific fields of multiple predetermined data items.

For example, in some embodiments where the aforementioned predetermined data items are various Bluetooth advertising packets, the audio broadcasting device 150 may insert the aforementioned predetermined volume instruction, Bluetooth address of the audio broadcasting device 150, and/or indication message into a single or multiple specific fields of a single Bluetooth advertising packet. Alternatively, the audio broadcasting device 150 may insert the above predetermined volume instruction, the above Bluetooth address, and/or the above indication message into specific fields of multiple Bluetooth advertising packets.

For another example, in some embodiments where the aforementioned predetermined data items are various BIS PDUs or BIG PDUs, the audio broadcasting device 150 may insert the aforementioned predetermined volume instruction, Bluetooth address of the audio broadcasting device 150, and/or indication message into a single or multiple specific fields of a single BIS PDU or a single or multiple specific fields of a single BIG PDU, or may alternatively insert the above predetermined volume instruction, the above Bluetooth address, and/or the above indication message into specific fields of multiple BIS PDUs or multiple BIG PDUs. In practice, the aforementioned specific fields may be Event Counter fields, Sub-Event Counter fields, Payload Counter fields, or the like in the BIS PDUs or the BIG PDUs.

In operation 210, the audio broadcasting device 150 may transmit the aforementioned one or more predetermined data items under the predetermined transmitting mode, so that the first Bluetooth member device 110 and the second Bluetooth member device 120, and other Bluetooth devices (e.g., the aforementioned third Bluetooth member device 130 and fourth Bluetooth member device 140) within the Bluetooth signal transmission range of the audio broadcasting device 150 can receive the aforementioned one or more predetermined data items.

For example, in some embodiments where the aforementioned predetermined transmitting mode is the Scannable mode, the Connectable mode, the Non-connectable mode, or the Non-Scannable mode, the one or more predetermined data items indicated in the aforementioned operation 208 and operation 210 may be one or more auxiliary advertising indication (AUX_ADV_IND) packets. Alternatively, the one or more predetermined data items indicated in the aforementioned operation 208 and operation 210 may be a group of packets formed by one or more extended advertising indication (ADV_EXT_IND) packets and one or more auxiliary advertising indication (AUX_ADV_IND) packets.

In this situation, if the aforementioned predetermined receiving mode is the LE Extended Passive Scan mode, the LE Extended Active Scan mode, or the LE Extended Initiator mode, then the first Bluetooth communication circuit 111 and the second Bluetooth communication circuit 121 may perform the operation 212 to receive the one or more predetermined data items transmitted from the audio broadcasting device 150.

For another example, in some embodiments where the aforementioned predetermined transmitting mode is the Non-connectable mode or the Non-Scannable mode, the one or more predetermined data items indicated in the aforementioned operation 208 and operation 210 may be one or more auxiliary chain indication (AUX_CHAIN_IND) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, and one or more auxiliary chain indication (AUX_CHAIN_IND) packets.

In this situation, if the aforementioned predetermined receiving mode is the LE Extended Passive Scan mode, then the first Bluetooth communication circuit 111 and the second Bluetooth communication circuit 121 may perform the operation 212 to receive the one or more predetermined data items transmitted from the audio broadcasting device 150.

For yet another example, in some embodiments where the aforementioned predetermined transmitting mode is the Scannable mode, the one or more predetermined data items indicated in the aforementioned operation 208 and operation 210 may be one or more auxiliary scan response (AUX_SCAN_RSP) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, and one or more auxiliary scan response (AUX_SCAN_RSP) packets. Alternatively, the one or more predetermined data items indicated in the aforementioned operation 208 and operation 210 may be a group of packets formed by one or more auxiliary scan response (AUX_SCAN_RSP) packets and one or more auxiliary chain indication (AUX_CHAIN_IND) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, one or more auxiliary scan response (AUX_SCAN_RSP) packets, and one or more auxiliary chain indication (AUX_CHAIN_IND) packets.

In this situation, if the aforementioned predetermined receiving mode is the LE Extended Active Scan mode, then the first Bluetooth communication circuit 111 and the second Bluetooth communication circuit 121 may perform the operation 212 to receive the one or more predetermined data items transmitted from the audio broadcasting device 150.

For yet another example, in some embodiments where the aforementioned predetermined transmitting mode is the Non-connectable mode, the Non-Scannable mode, the Periodic Advertising mode, the LE Extended Advertising mode, or the LE Periodic Advertising mode, the one or more predetermined data items indicated in the aforementioned operation 208 and operation 210 may be one or more auxiliary synchronous indication (AUX_SYNC_IND) packets. Alternatively, the one or more predetermined data items indicated in the aforementioned operation 208 and operation 210 may be a group of packets formed by one or more extended advertising indication (ADV_EXT_IND) packets, one or more auxiliary advertising indication (AUX_ADV_IND) packets, and one or more auxiliary synchronous indication (AUX_SYNC_IND) packets.

In this situation, if the aforementioned predetermined receiving mode is the Periodic Scanning mode, then the first Bluetooth communication circuit 111 and the second Bluetooth communication circuit 121 may perform the operation 212 to receive the one or more predetermined data items transmitted from the audio broadcasting device 150.

For yet another example, in some embodiments where the aforementioned predetermined transmitting mode is an advertising mode specified by the Bluetooth communication protocol of the Bluetooth Version 4.0, the one or more predetermined data items indicated in the aforementioned operation 208 and operation 210 may be one or more advertising indication (ADV_IND) packets, one or more non-connectable advertising indication (ADV_NONCONN_IND) packets, or one or more discoverable advertisement indication (ADV_DISCOVER_IND) packets. Alternatively, the one or more predetermined data items indicated in the aforementioned operation 208 and operation 210 may be a group of packets formed by one or more advertising indication (ADV_IND) packets and one or more non-connectable advertising indication (ADV_NONCONN_IND) packets. Alternatively, the one or more predetermined data items indicated in the aforementioned operation 208 and operation 210 may be a group of packets formed by one or more advertising indication (ADV_IND) packets and one or more discoverable advertisement indication (ADV_DISCOVER_IND) packets. Alternatively, the one or more predetermined data items indicated in the aforementioned operation 208 and operation 210 may be a group of packets formed by of one or more advertising indication (ADV_IND) packets, one or more non-connectable advertising indication (ADV_NONCONN_IND) packets, and one or more discoverable advertisement indication (ADV_DISCOVER_IND) packets.

In this situation, if the aforementioned predetermined receiving mode is a mode capable of receiving the aforementioned predetermined data items, then the first Bluetooth communication circuit 111 and the second Bluetooth communication circuit 121 may perform the operation 212 to receive the one or more predetermined data items transmitted from the audio broadcasting device 150.

For yet another example, in some embodiments where the aforementioned predetermined transmitting mode is the Broadcast Isochronous Broadcasting mode or the Broadcast Isochronous Synchronization mode, the one or more predetermined data items indicated in the aforementioned operation 208 and operation 210 may be one or more BIS PDUs. Alternatively, the one or more predetermined data items indicated in the aforementioned operation 208 and operation 210 may be one or more BIG PDUs. Alternatively, the one or more predetermined data items indicated in the aforementioned operation 208 and operation 210 may be a group of PDUs formed by one or more BIS PDUs and one or more BIG PDUs.

In this situation, if the aforementioned predetermined receiving mode is an operation mode capable of receiving various PDUs through the BIS logical transports and/or capable of receiving various PDUs through the BIG logical transports, then the first Bluetooth communication circuit 111 and the second Bluetooth communication circuit 121 may perform the operation 212 to receive the one or more predetermined data items transmitted from the audio broadcasting device 150.

Then, the first Bluetooth member device 110 performs the operation 214 and the operation 216, and the second Bluetooth member device 120 performs the operation 218 and the operation 220.

In the operation 214, the first control circuit 114 may parse the one or more predetermined data items received by the first Bluetooth communication circuit 111 to extract a predetermined volume instruction corresponding to a predetermined volume. In some embodiments, the first control circuit 114 may also extract a Bluetooth address of the audio broadcasting device 150 and/or an indication message indicating that the audio broadcasting device 150 is about to start the audio broadcasting from the one or more predetermined data items received by the first Bluetooth communication circuit 111.

In the operation 216, the first control circuit 114 may control the first audio processing circuit 112 to configure an audio volume of the first audio playback circuit 113 in advance according to the predetermined volume instruction. In operations, the first control circuit 114 may control the first audio processing circuit 112 to configure a gain of the first audio playback circuit 113 in advance according to the predetermined volume instruction, so as to configure the audio volume of the first audio playback circuit 113.

In the operation 218, the second control circuit 124 may parse the one or more predetermined data items received by the second Bluetooth communication circuit 121 to extract a predetermined volume instruction corresponding to a predetermined volume. In some embodiments, the second control circuit 124 may also extract a Bluetooth address of the audio broadcasting device 150 and/or an indication message indicating that the audio broadcasting device 150 is about to start the audio broadcasting from the one or more predetermined data items received by the second Bluetooth communication circuit 121.

In the operation 220, the second control circuit 124 may control the second audio processing circuit 122 to configure an audio volume of the second audio playback circuit 123 in advance according to the predetermined volume instruction. In operations, the second control circuit 124 may control the second audio processing circuit 122 to configure a gain of the second audio playback circuit 123 in advance according to the predetermined volume instruction, so as to configure the audio volume of the second audio playback circuit 123.

The predetermined volume instruction received by the first Bluetooth member device 110 and the second Bluetooth member device 120 corresponds to a predetermined volume configured by the audio broadcasting device 150. As described previously, the aforementioned predetermined volume is a volume that most people feel comfortable and not too loud, such as about 45~60 dB.

In the aforementioned operation 216, the first control circuit 114 may control the first audio processing circuit 112 to configure the gain of the first audio playback circuit 113 according to the predetermined volume instruction, so as to adjust the audio volume of the first audio playback circuit 113 to be close to or equal to the aforementioned predetermined volume in advance.

Similarly, in the aforementioned operation 220, the second control circuit 124 may control the second audio processing circuit 122 to configure the gain of the second audio playback circuit 123 according to the predetermined volume instruction, so as to adjust the audio volume of the second audio playback circuit 123 to be close to or equal to the aforementioned predetermined volume in advance.

In other words, in this embodiment, before playing the audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

In the operation 222, the audio broadcasting device 150 may generate one or more Bluetooth LE (BLE) audio packets containing a predetermined audio data. In operations, the audio broadcasting device 150 may utilize the Low Complexity Communication Codec (LC3) to encode the predetermined audio data and insert the encoded data into one or more BLE audio packets. In practice, the audio broadcasting device 150 may utilize other appropriate encoding approaches to encode the predetermined audio data.

In the operation 224, the audio broadcasting device 150 may broadcast one or more BLE audio packets containing the aforementioned predetermined audio data through one or more BIS logical transports. In operations, the audio broadcasting device 150 may operate based on the approaches specified by the BLE Audio technology to broadcast the BLE audio packet containing the predetermined audio data to other Bluetooth member devices.

In the operation 226, the first Bluetooth communication circuit 111 of the first Bluetooth member device 110 receives the one or more BLE audio packets transmitted from the audio broadcasting device 150 through the aforementioned one or more BIS logical transports, and the second Bluetooth communication circuit 121 of the second Bluetooth member device 120 receives the one or more BLE audio packets transmitted from the audio broadcasting device 150 through the aforementioned one or more BIS logical transports.

Then, the first Bluetooth member device 110 performs the operation 228 and the operation 230, and the second Bluetooth member device 120 performs the operation 232 and the operation 234.

In the operation 228, the first control circuit 114 may parse the one or more BLE audio packets received by the first Bluetooth communication circuit 111 to extract the predetermined audio data generated by the audio broadcasting device 150.

In the operation 230, the first control circuit 114 may instruct the first audio processing circuit 112 to control the first audio playback circuit 113 to playback the predetermined audio data.

In the operation 232, the second control circuit 124 may parse the one or more BLE audio packets received by the second Bluetooth communication circuit 121 to extract the predetermined audio data generated by the audio broadcasting device 150.

In the operation 234, the second control circuit 124 may instruct the second audio processing circuit 122 to control the second audio playback circuit 123 to playback the predetermined audio data.

Since the first Bluetooth member device 110 and the second Bluetooth member device 120 receive the BLE audio packet transmitted from the audio broadcasting device 150 through the BIS logical transports, when the first audio playback circuit 113 playbacks the predetermined audio data, the second audio playback circuit 123 synchronously playbacks the predetermined audio data. In other words, the operation 230 and the operation 234 are performed synchronously.

The audio broadcasting device 150 may repeatedly perform the operation 222 and the operation 224 to broadcast subsequent predetermined audio data. On the other hand, the first Bluetooth member device 110 may repeatedly perform the operation 226, the operation 228, and the operation 230 to receive and playback the subsequent predetermined audio data, and the second Bluetooth member device 120 may repeatedly perform the operation 226, the operation 232, and the operation 234 to receive and playback the subsequent predetermined audio data.

Similarly, other Bluetooth member devices in the Bluetooth audio broadcasting system 100 (e.g., the aforementioned third Bluetooth member device 130 and fourth Bluetooth member device 140) may receive the BLE audio packets broadcasted by the audio broadcasting device 150 and playback the predetermined audio data contained in the BLE audio packets according to the foregoing approaches adopted by the first Bluetooth member device 110 or the second Bluetooth member device 120.

As can be appreciated from the foregoing descriptions of FIG. 1 through FIG. 2, before beginning to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will also be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

In the aforementioned embodiment, the Bluetooth audio broadcasting system 100 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 100 not only reduces the power consumption of the first Bluetooth member device 110 and the second Bluetooth member device 120 to thereby extend the serving time of the first Bluetooth member device 110 and the second Bluetooth member device 120, but also effectively improves the overall audio quality of audio broadcasting.

Similarly, before beginning to playback the predetermined audio data transmitted from the audio broadcasting device 150, other Bluetooth member devices in the Bluetooth audio broadcasting system 100 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150.

As a result, when beginning to synchronously playback the predetermined audio data, the audio volume of other Bluetooth member devices in the Bluetooth audio broadcasting system 100 can make the user feel comfortable and will not cause discomfort or displeasure to the user.

As described previously, when the user listens to the audio broadcast played by the aforementioned multi-member Bluetooth device (e.g., the first Bluetooth member device 110, the second Bluetooth member device 120, the third Bluetooth member device 130, and/or the fourth Bluetooth member device 140), the user's attention to the external sounds will inevitably decrease, and sometimes the user may not notice the external sounds at all. At this time, if an emergency event (e.g., an air raid alert, a tsunami alert, a fire alarm, an emergency broadcast, an officials' voice broadcast, etc.) suddenly occurs, the user may fall into a dangerous situation or delay responding to the emergency event due to not hearing the sounds of the external alert.

In order to avoid the aforementioned problems, the audio broadcasting device 150 in the embodiment of FIG. 1 further comprises a detection circuit 152, arranged to operably detect the alert signals (e.g., an earthquake warning message, a tsunami warning message, or the like) transmitted from the outside, or specific ambient sounds (e.g., an air raid alert, a fire alarm, an emergency broadcast, or an officials' voice broadcast, etc.).

During the period at which the aforementioned multi-member Bluetooth device plays the audio broadcast transmitted from the audio broadcasting device 150, the detection circuit 152 detects whether the audio broadcasting device 150 receives a predetermined alert signal (e.g., earthquake warning messages, tsunami warning messages, or the like transmitted from the government or other organizations through telecommunication systems or various wireless transmission mechanisms) or specific ambient sounds (e.g., an air raid alert, a fire alarm, an emergency broadcast, or an officials' voice broadcast, etc.). In practice, the detection circuit 152 may be realized with a processing circuit (not shown) of the audio broadcasting device 150 and/or various appropriate sound capturing and recognition circuits (e.g., a cooperation of a microphone and a sound recognition circuit, not shown in the drawings).

For example, the detection circuit 152 may detect whether the audio broadcasting device 150 receives any alert signal, such as earthquake warning messages, tsunami warning messages, or the like, transmitted from the government or other organizations through telecommunication systems or various wireless transmission mechanisms or not.

For another example, the detection circuit 152 may capture the ambient sounds, and compare the captured sounds with one or more predetermined sound patterns (e.g., the sound patterns of an air raid alert, a tsunami alert, or a fire alarm) to determine whether specific ambient sound (e.g., an air raid alert, a tsunami alert, a fire alarm, or the like) occur in the surrounding environment of the audio broadcasting device 150.

For another example, the detection circuit 152 may capture the ambient sounds, and recognize and analyze the voice contents of the captured sounds to determine whether specific ambient sound (e.g., various emergency broadcasts or the officials' voice broadcast) occur in the surrounding environment of the audio broadcasting device 150.

In this embodiment, when the aforementioned alert signals or specific ambient sounds are detected by the detection circuit 152, the audio broadcasting device 150 may generate and transmit a corresponding target control command to the first Bluetooth member device 110, the second Bluetooth member device 120, the third Bluetooth member device 130, and the fourth Bluetooth member device 140 to instruct the first Bluetooth member device 110, the second Bluetooth member device 120, the third Bluetooth member device 130, and the fourth Bluetooth member device 140 to reduce their audio volume to be lower than a predetermined threshold, so as to avoid the user from missing the alert signal or specific ambient sounds transmitted from the external environment. As a result, this mechanism can prevent the user from unknowingly getting into a dangerous situation or missing important information from the outside world and delaying the timing of responding to the situation.

For example, as shown in FIG. 3, the audio broadcasting device 150 may perform the operation 302 of FIG. 3 when the aforementioned alert signals or specific ambient sounds are detected by the detection circuit 152.

In the operation 302, the audio broadcasting device 150 may generate a target control command utilized for instructing the multi-member Bluetooth device to reduce the output audio volume to be lower than a predetermined threshold (e.g., 20 dB, 15 dB, 10 dB, 5 dB, or the like), and insert the target control command into one or more target data items. In some embodiments, the target control command may be a mute command, a pause command, or a stop command. In another embodiment, the target control command may be a command for instructing the multi-member Bluetooth device to significantly reduce the audio volume for a predetermined percentage (e.g., 50%, 70%, 90%, or the like) or to greatly reduce the audio volume for a predetermined decibel (e.g., 20 dB, 30 dB, 40 dB, or the like). In operations, the audio broadcasting device 150 may insert the target control command into a single or multiple specific fields of a single target data item. Alternatively, the audio broadcasting device 150 may insert the above target control command into specific fields of multiple target data items.

For example, in some embodiments where the aforementioned target data items are various Bluetooth advertising packets, the audio broadcasting device 150 may insert the aforementioned target control command into a single or multiple specific fields of a single Bluetooth advertising packet. Alternatively, the audio broadcasting device 150 may insert the above target control command into specific fields of multiple Bluetooth advertising packets.

For another example, in some embodiments where the aforementioned target data items are various BIS PDUs or BIG PDUs, the audio broadcasting device 150 may insert the aforementioned target control command into a single or multiple specific fields of a single BIS PDU or a single or multiple specific fields of a single BIG PDU, or may alternatively insert the above target control command into specific fields of multiple BIS PDUs or multiple BIG PDUs. In practice, the aforementioned specific fields may be Event Counter fields, Sub-Event Counter fields, Payload Counter fields, or the like in the BIS PDUs or the BIG PDUs.

In the operation 304, the audio broadcasting device 150 may transmit the aforementioned one or more target data items under a target transmitting mode, so that the first Bluetooth member device 110 and the second Bluetooth member device 120 and other Bluetooth devices (e.g., the aforementioned third Bluetooth member device 130 and fourth Bluetooth member device 140) within the Bluetooth signal transmission range of the audio broadcasting device 150 can receive the aforementioned one or more target data items.

For example, in some embodiments where the aforementioned target transmitting mode is the Scannable mode, the Connectable mode, the Non-connectable mode, or the Non-Scannable mode, the one or more target data items indicated in the aforementioned operation 302 and operation 304 may be one or more auxiliary advertising indication (AUX_ADV_IND) packets. Alternatively, the one or more target data items indicated in the aforementioned operation 302 and operation 304 may be a group of packets formed by one or more extended advertising indication (ADV_EXT_IND) packets and one or more auxiliary advertising indication (AUX_ADV_IND) packets.

In this situation, if the first Bluetooth communication circuit 111 and the second Bluetooth communication circuit 121 operate in the LE Extended Passive Scan mode, the LE Extended Active Scan mode, or the LE Extended Initiator mode, then the first Bluetooth communication circuit 111 and the second Bluetooth communication circuit 121 may perform the operation 306 to receive the one or more target data items transmitted from the audio broadcasting device 150.

For another example, in some embodiments where the aforementioned target transmitting mode is the Non-connectable mode or the Non-Scannable mode, the one or more target data items indicated in the aforementioned operation 302 and operation 304 may be one or more auxiliary chain indication (AUX_CHAIN_IND) packets. Alternatively, the one or more target data items indicated in the aforementioned operation 302 and operation 304 may be a group of packets formed by one or more extended advertising indication (ADV_EXT_IND) packets, one or more auxiliary advertising indication (AUX_ADV_IND) packets, and one or more auxiliary chain indication (AUX_CHAIN_IND) packets.

In this situation, if the first Bluetooth communication circuit 111 and the second Bluetooth communication circuit 121 operate in the LE Extended Passive Scan mode, then the first Bluetooth communication circuit 111 and the second Bluetooth communication circuit 121 may perform the operation 306 to receive the one or more target data items transmitted from the audio broadcasting device 150.

For yet another example, in some embodiments where the aforementioned target transmitting mode is the Scannable mode, the one or more target data items indicated in the aforementioned operation 302 and operation 304 may be one or more auxiliary scan response (AUX_SCAN_RSP) packets. Alternatively, the one or more target data items indicated in the aforementioned operation 302 and operation 304 may be a group of packets formed by one or more extended advertising indication (ADV_EXT_IND) packets, one or more auxiliary advertising indication (AUX_ADV_IND) packets, and one or more auxiliary scan response (AUX_SCAN_RSP) packets. Alternatively, the one or more target data items indicated in the aforementioned operation 302 and operation 304 may be a group of packets formed by one or more auxiliary scan response (AUX_SCAN_RSP) packets and one or more auxiliary chain indication (AUX_CHAIN_IND) packets. Alternatively, the one or more target data items indicated in the aforementioned operation 302 and operation 304 may be a group of packets formed by one or more extended advertising indication (ADV_EXT_IND) packets, one or more auxiliary advertising indication (AUX_ADV_IND) packets, one or more auxiliary scan response (AUX_SCAN_RSP) packets, and one or more auxiliary chain indication (AUX_CHAIN_IND) packets.

In this situation, if the first Bluetooth communication circuit 111 and the second Bluetooth communication circuit 121 operate in the LE Extended Active Scan mode, then the first Bluetooth communication circuit 111 and the second Bluetooth communication circuit 121 may perform the operation 306 to receive the one or more target data items transmitted from the audio broadcasting device 150.

For yet another example, in some embodiments where the aforementioned target transmitting mode is the Non-connectable mode, the Non-Scannable mode, the Periodic Advertising mode, the LE Extended Advertising mode, or the LE Periodic Advertising mode, the one or more target data items indicated in the aforementioned operation 302 and operation 304 may be one or more auxiliary synchronous indication (AUX_SYNC_IND) packets. Alternatively, the one or more target data items indicated in the aforementioned operation 302 and operation 504 may be a group of packets formed by one or more extended advertising indication (ADV_EXT_IND) packets, one or more auxiliary advertising indication (AUX_ADV_IND) packets, and one or more auxiliary synchronous indication (AUX_SYNC_IND) packets.

In this situation, if the first Bluetooth communication circuit 111 and the second Bluetooth communication circuit 121 operate in the Periodic Scanning mode, then the first Bluetooth communication circuit 111 and the second Bluetooth communication circuit 121 may perform the operation 306 to receive the one or more target data items transmitted from the audio broadcasting device 150.

For yet another example, in some embodiments where the aforementioned target transmitting mode is an advertising mode specified by the Bluetooth communication protocol of the Bluetooth Version 4.0, the one or more target data items indicated in the aforementioned operation 302 and operation 304 may be one or more advertising indication (ADV_IND) packets, one or more non-connectable advertising indication (ADV_NONCONN_IND) packets, or one or more discoverable advertisement indication (ADV_DISCOVER_IND) packets. Alternatively, the one or more target data items indicated in the aforementioned operation 302 and operation 304 may be a group of packets formed by one or more advertising indication (ADV_IND) packets and one or more non-connectable advertising indication (ADV_NONCONN_IND) packets. Alternatively, the one or more target data items indicated in the aforementioned operation 302 and operation 304 may be a group of packets formed by one or more advertising indication (ADV_IND) packets and one or more discoverable advertisement indication (ADV_DISCOVER_IND) packets. Alternatively, the one or more target data items indicated in the aforementioned operation 302 and operation 304 may be a group of packets formed by one or more advertising indication (ADV_IND) packets, one or more non-connectable advertising indication (ADV_NONCONN_IND) packets, and one or more discoverable advertisement indication (ADV_DISCOVER_IND) packets.

In this situation, if the first Bluetooth communication circuit 111 and the second Bluetooth communication circuit 121 operate in a mode capable of receiving the aforementioned target data items, then the first Bluetooth communication circuit 111 and the second Bluetooth communication circuit 121 may perform the operation 306 to receive the one or more target data items transmitted from the audio broadcasting device 150.

For yet another example, in some embodiments where the aforementioned target transmitting mode is the Broadcast Isochronous Broadcasting mode or the Broadcast Isochronous Synchronization mode, the one or more target data items indicated in the aforementioned operation 302 and operation 304 may be one or more BIS PDUs. Alternatively, the one or more target data items indicated in the aforementioned operation 302 and operation 304 may be one or more BIG PDUs. Alternatively, the one or more target data items indicated in the aforementioned operation 302 and operation 304 may be a group of PDUs formed by one or more BIS PDUs and one or more BIG PDUs.

In this situation, if the first Bluetooth communication circuit 111 and the second Bluetooth communication circuit 121 operate in an operation mode capable of receiving various PDUs through the BIS logical transports and/or capable of receiving various PDUs through the BIG logical transports, then the first Bluetooth communication circuit 111 and the second Bluetooth communication circuit 121 may perform the operation 306 to receive the one or more target data items transmitted from the audio broadcasting device 150.

Then, the first Bluetooth member device 110 performs the operation 308 and the operation 310, and the second Bluetooth member device 120 performs the operation 312 and the operation 314.

In the operation 308, the first control circuit 114 may parse the one or more target data items received by the first Bluetooth communication circuit 111 to extract a target control command.

In the operation 310, the first control circuit 114 may control the first audio processing circuit 112 to reduce the audio volume of the first audio playback circuit 113 to be lower than the predetermined threshold according to the target control command. In operations, the first control circuit 114 may control the first audio processing circuit 112 to greatly reduce the gain of the first audio playback circuit 113 or to reduce the gain of the first audio playback circuit 113 to be lower than a predetermined level according to the target control command, so as to reduce the audio volume of the first audio playback circuit 113 to be lower than the predetermined threshold. Alternatively, the first control circuit 114 may control the first audio processing circuit 112 to switch the first audio playback circuit 113 to a mute mode, pause the audio playing operation of the first audio playback circuit 113, or stop the audio playing operation of the first audio playback circuit 113 according to the target control command.

In the operation 312, the second control circuit 124 may parse the one or more target data items received by the second Bluetooth communication circuit 121 to extract a target control command.

In the operation 314, the second control circuit 124 may control the second audio processing circuit 122 to reduce the audio volume of the second audio playback circuit 123 to be lower than the predetermined threshold according to the target control command. In operations, the second control circuit 124 may control the second audio processing circuit 122 to greatly reduce the gain of the second audio playback circuit 123 or to reduce the gain of the second audio playback circuit 123 to be lower than a predetermined level according to the target control command, so as to reduce the audio volume of the second audio playback circuit 123 to be lower than the predetermined threshold. Alternatively, the second control circuit 124 may control the second audio processing circuit 122 to switch the second audio playback circuit 123 to a mute mode, pause the audio playing operation of the second audio playback circuit 123, or stop the audio playing operation of the second audio playback circuit 123 according to the target control command.

Since the first Bluetooth member device 110 and the second Bluetooth member device 120 adjust the audio volume according to the target control command contained in the target data items transmitted from the audio broadcasting device 150, when the first audio processing circuit 112 reduces the audio volume of the first audio playback circuit 113 to be lower than the predetermined threshold, the second audio processing circuit 122 synchronously reduces the audio volume of the second audio playback circuit 123 to be lower than the predetermined threshold. In other words, the operation 310 and the operation 314 are performed synchronously.

Similarly, other Bluetooth member devices in the Bluetooth audio broadcasting system 100 (e.g., the aforementioned third Bluetooth member device 130 and fourth Bluetooth member device 140) may receive the BLE audio packets broadcasted by the audio broadcasting device 150, playback the predetermined audio data contained in the BLE audio packets, and synchronously reduce the audio volume to be lower than the predetermined threshold based on the target control command contained in the target data items transmitted from the audio broadcasting device 150 according to the foregoing approaches adopted by the first Bluetooth member device 110 or the second Bluetooth member device 120.

In other words, during the period at which the first Bluetooth member device 110 and the second Bluetooth member device 120 playback the audio data broadcasted by the audio broadcasting device 150, the audio broadcasting device 150 may broadcast a target control command to the first Bluetooth member device 110 and the second Bluetooth member device 120 when the aforementioned alert signal or specific ambient sound is detected by the detection circuit 152, so as to synchronously reduce the audio volume of the first Bluetooth member device 110 and the second Bluetooth member device 120 to be lower than the predetermined threshold.

Similarly, during the period at which the third Bluetooth member device 130 and the fourth Bluetooth member device 140 playback the audio data broadcasted by the audio broadcasting device 150, the audio broadcasting device 150 may broadcast a target control command to the third Bluetooth member device 130 and the fourth Bluetooth member device 140 when the aforementioned alert signal or specific ambient sound is detected by the detection circuit 152, so as to synchronously reduce the audio volume of the third Bluetooth member device 130 and the fourth Bluetooth member device 140 to be lower than the predetermined threshold.

In some embodiments where the first Bluetooth member device 110 and the second Bluetooth member device 120 are a pair of earphones with noise-cancelling capability, after the audio broadcasting device 150 utilizes the target control command to instruct the first Bluetooth member device 110 and the second Bluetooth member device 120 to reduce the audio volume to be lower than the predetermined threshold, the audio broadcasting device 150 may further transmit a mode-switching command to the first Bluetooth member device 110 and the second Bluetooth member device 120 to instruct the first Bluetooth member device 110 and the second Bluetooth member device 120 to switch from a noise cancellation mode to a transparency mode, so as to further increase the user's capability of receiving external sounds.

Similarly, in some embodiments where the third Bluetooth member device 130 and the fourth Bluetooth member device 140 are a pair of earphones with noise-cancelling capability, after the audio broadcasting device 150 utilizes the target control command to instruct the third Bluetooth member device 130 and the fourth Bluetooth member device 140 to reduce the audio volume to be lower than the predetermined threshold, the audio broadcasting device 150 may further transmit a mode-switching command to the third Bluetooth member device 130 and the fourth Bluetooth member device 140 to instruct the third Bluetooth member device 130 and the fourth Bluetooth member device 140 to switch from a noise cancellation mode to a transparency mode, so as to further increase related user's capability of receiving external sounds.

As can be appreciated from the foregoing descriptions of FIG. 1 through FIG. 3, before the multi-member Bluetooth device in the Bluetooth audio broadcasting system 100 begins to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will also be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

Similarly, before beginning to playback the predetermined audio data transmitted from the audio broadcasting device 150, other Bluetooth member devices in the Bluetooth audio broadcasting system 100 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150. Therefore, when beginning to synchronously playback the predetermined audio data, the audio volume of other Bluetooth member devices in the Bluetooth audio broadcasting system 100 can make the user feel comfortable and will not cause discomfort or displeasure to the user.

In addition, during the period at which the multi-member Bluetooth device in the Bluetooth audio broadcasting system 100 playbacks the audio data broadcasted by the audio broadcasting device 150, the audio broadcasting device 150 may broadcast a target control command to respective Bluetooth member devices when the aforementioned alert signal or specific ambient sound is detected by the detection circuit 152, so as to synchronously reduce the audio volume of the respective Bluetooth member devices to be lower than the predetermined threshold. In other words, the disclosed Bluetooth audio broadcasting system 100 can synchronously reduce the audio volume of different Bluetooth member devices in the Bluetooth audio broadcasting system 100 to be lower than the predetermined threshold when the audio broadcasting device 150 receives the alert signal (e.g., the earthquake warning message, the tsunami warning message, or the like) or when specific ambient sounds (e.g., the air raid alert, the tsunami alert, the fire alarm, various emergency broadcast, or the officials' voice broadcast, etc.) occur in a surrounding environment of the audio broadcasting device 150, so as to avoid the user from getting into a dangerous situation or delaying the timing of responding to the situation due to missing the alert signal or specific ambient sounds transmitted from the external environment.

Moreover, the Bluetooth audio broadcasting system 100 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 100 not only reduces the power consumption of the multi-member Bluetooth device to thereby extend the serving time of the multi-member Bluetooth device, but also effectively improves the overall audio quality of audio broadcasting.

Figure 4:
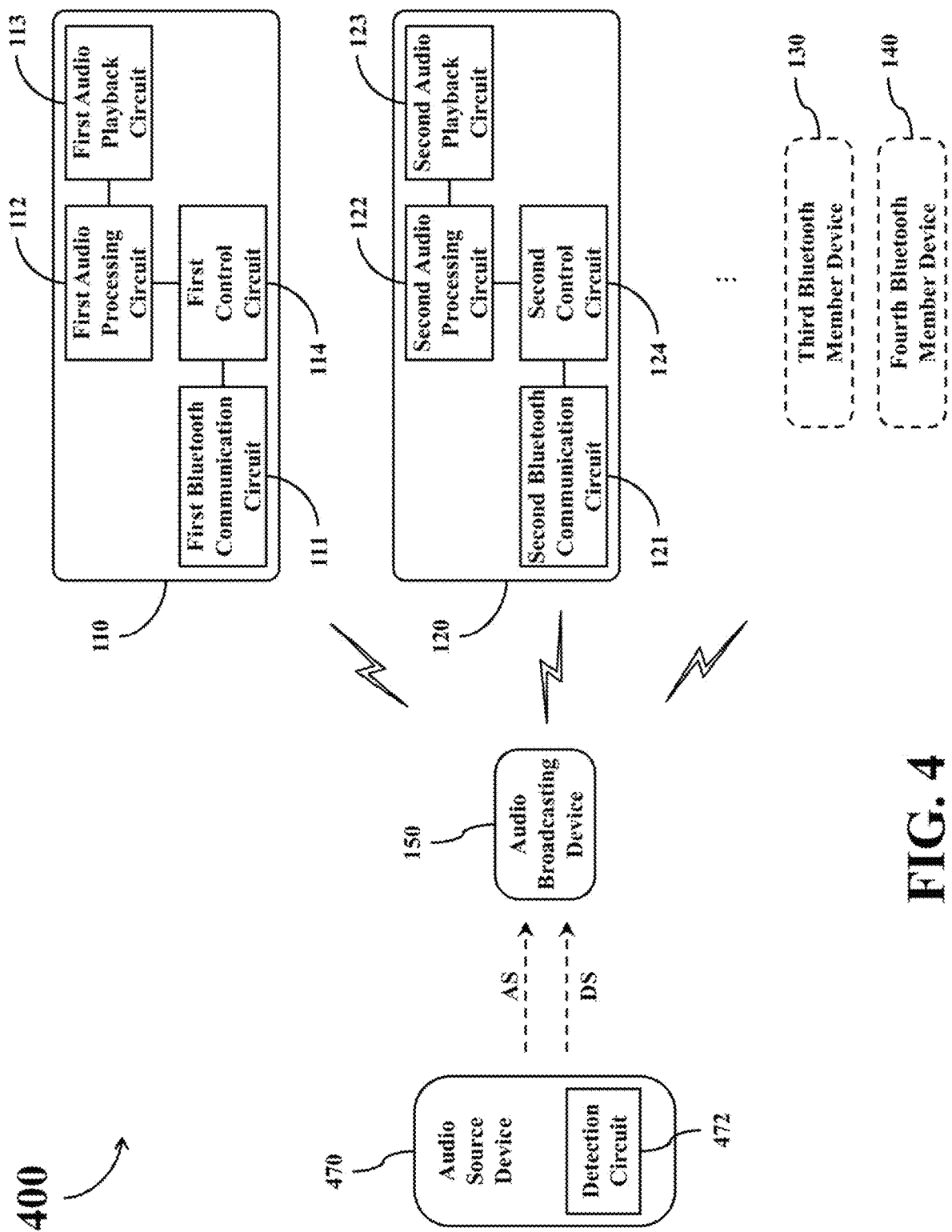
FIG. 4 shows a simplified functional block diagram of a Bluetooth audio broadcasting system according to a second embodiment of the present disclosure.

Please refer to FIG. 4, which shows a simplified functional block diagram of a Bluetooth audio broadcasting system 400 according to a second embodiment of the present disclosure. Similar to the Bluetooth audio broadcasting system 100 of FIG. 1, the Bluetooth audio broadcasting system 400 of FIG. 4 also comprises the audio broadcasting device 150 and multiple Bluetooth member devices (e.g., the aforementioned first Bluetooth member device 110, second Bluetooth member device 120, third Bluetooth member device 130, and fourth Bluetooth member device 140). In addition, the Bluetooth audio broadcasting system 400 further comprises an audio source device 470.

The audio source device 470 is arranged to operably capture the user's voice to generate a corresponding audio signal AS and to operably utilize various wired or wireless transmission approaches to transmit the audio signal AS to the audio broadcasting device 150. In the embodiment of FIG. 4, the audio broadcasting device 150 is further arranged to operably convert the audio signal AS transmitted from the audio source device 470 into the predetermined audio data to be broadcasted. In other words, in the embodiment of FIG. 4, the contents of the predetermined audio data broadcasted by the audio broadcasting device 150 are originated from the audio source device 470.

In operations, the audio broadcasting device 150 may adopt the BLE Audio technology specified by the Bluetooth Core Specification Version 5.2 or newer versions to broadcast the predetermined audio data. Similar to the embodiment of FIG. 1, the audio broadcasting device 150 may broadcast the BLE audio packets containing the predetermined audio data to multiple Bluetooth member devices in the Bluetooth audio broadcasting system 400 (e.g., the first Bluetooth member device 110, the second Bluetooth member device 120, the third Bluetooth member device 130, and the fourth Bluetooth member device 140 illustrated in FIG. 4) through the BIS logical transports.

Each Bluetooth member device in the Bluetooth audio broadcasting system 400 may receive and playback the predetermined audio data broadcasted by the audio broadcasting device 150 according to the approach of corresponding device in the embodiment of FIG. 1.

In the embodiment of FIG. 4, the audio source device 470 further comprises a detection circuit 472 arranged to operably detect alert signals (e.g., an earthquake warning message, a tsunami warning message) or specific ambient sounds (e.g., an air raid alert, a fire alarm, an emergency broadcast, an officials' voice broadcast, etc.).

During the period at which the aforementioned multi-member Bluetooth device playbacks the audio broadcast transmitted from the audio broadcasting device 150, the detection circuit 472 would detect whether the audio source device 470 receives predetermined alert signals (e.g., an earthquake warning message, a tsunami warning message, or the like transmitted from a governmental department or other organizations through the telecommunication system or various wireless transmission mechanisms) or specific ambient sounds (e.g., an air raid alert, a fire alarm, an emergency broadcast, an officials' voice broadcast, etc.). In practice, the detection circuit 472 may be realized with a processing circuit (not shown) of the audio source device 470 and/or various appropriate sound capturing and recognition circuit (e.g., an cooperation of a microphone and a sound recognition circuit, not shown in the drawings).

For example, the detection circuit 472 may detect whether any alert signal, such as an earthquake warning message or a tsunami warning message, transmitted from any governmental department or other organizations through the telecommunication system or various wireless transmission mechanisms is received by the audio source device 470.

For another example, the detection circuit 472 may capture the external sounds, and compare the captured sounds with one or more predetermined sound patterns (e.g., the sound patterns of an air raid alert, a tsunami alert, or a fire alarm) to determine whether specific ambient sounds, such as an air raid alert, a tsunami alert, or a fire alarm, occur in the surrounding environment of the audio source device 470.

For another example, the detection circuit 472 may capture the external sounds, and conduct voice content analysis and recognition operation on the captured sounds to determine whether specific ambient sounds, such as various emergency broadcasts or officials' voice broadcast, occur in the surrounding environment of the audio source device 470.

In this embodiment, the audio source device 470 may generate and transmit a corresponding detection signal DS to the audio broadcasting device 150 when the aforementioned alert signal or specific ambient sound is detected by the detection circuit 472. The audio broadcasting device 150 may generate a corresponding target control command when receiving the detection signal DS transmitted from the audio source device 470, and then transmit the target control command to the first Bluetooth member device 110, the second Bluetooth member device 120, the third Bluetooth member device 130, and the fourth Bluetooth member device 140 to instruct the first Bluetooth member device 110, the second Bluetooth member device 120, the third Bluetooth member device 130, and the fourth Bluetooth member device 140 to reduce their audio volume to be lower than the predetermined threshold, so as to prevent the user from missing the alert signal or the specific ambient sounds transmitted from the outside world. As a result, this mechanism can prevent the user from unknowingly getting into a dangerous situation or missing important information from the outside world and delaying the timing of responding to the situation.

In practice, the aforementioned audio source device 470 may be realized with various appropriate circuits capable of capturing and converting sounds into corresponding audio signal AS, capable of generating the detection signal DS according to the detecting results of the detection circuit 472, and supporting appropriate signal transmission approaches. For example, the audio source device 470 may be realized with a laptop computer, a tablet computer, a mobile communication device (e.g., a mobile phone), a wearable device, a video conference system, or various types of wireless microphones.

In the embodiment of FIG. 4, the audio broadcasting device 150 may perform the operation 302 and the operation 304 of FIG. 3 when receiving the detection signal DS generated by the audio source device 470, so as to transmit the target control command to the multiple Bluetooth member devices in the Bluetooth audio broadcasting system 400 (e.g., the aforementioned first Bluetooth member device 110, second Bluetooth member device 120, third Bluetooth member device 130, and fourth Bluetooth member device 140).

The foregoing descriptions regarding the implementations and connections of other circuits and devices in FIG. 1 are also applicable to the Bluetooth audio broadcasting system 400 of FIG. 4. The foregoing descriptions regarding the generation and transmission approaches of the predetermined data item and the target data item in FIG. 2 and FIG. 3 are also applicable to the Bluetooth audio broadcasting system 400 of FIG. 4. For the sake of brevity, the descriptions will not be repeated here.

As can be appreciated from the foregoing descriptions of FIG. 4, before the multi-member Bluetooth device in the Bluetooth audio broadcasting system 400 begins to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will also be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

Similarly, before beginning to playback the predetermined audio data transmitted from the audio broadcasting device 150, other Bluetooth member devices in the Bluetooth audio broadcasting system 400 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150. Therefore, when beginning to synchronously playback the predetermined audio data, the audio volume of other Bluetooth member devices in the Bluetooth audio broadcasting system 400 can make the user feel comfortable and will not cause discomfort or displeasure to the user.

In addition, during the period at which the multi-member Bluetooth device in the Bluetooth audio broadcasting system 400 playbacks the audio data broadcasted by the audio broadcasting device 150, the audio source device 470 may further utilize the detection signal DS to instruct the audio broadcasting device 150 to broadcast a target control command to respective Bluetooth member devices when the aforementioned alert signal or specific ambient sound is detected by the detection circuit 472, so as to synchronously reduce the audio volume of the respective Bluetooth member devices to be lower than the predetermined threshold. In other words, the disclosed Bluetooth audio broadcasting system 400 can synchronously reduce the audio volume of different Bluetooth member devices in the Bluetooth audio broadcasting system 400 to be lower than the predetermined threshold when the audio source device 470 receives the alert signal (e.g., the earthquake warning message, the tsunami warning message, or the like) or when specific ambient sounds (e.g., the air raid alert, the tsunami alert, the fire alarm, various emergency broadcast, or the officials' voice broadcast, etc.) occur in a surrounding environment of the audio source device 470, so as to avoid the user from getting into a dangerous situation or delaying the timing of responding to the situation due to missing the alert signal or specific ambient sounds transmitted from the external environment.

Moreover, the Bluetooth audio broadcasting system 400 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 400 not only reduces the power consumption of the multi-member Bluetooth device to thereby extend the serving time of the multi-member Bluetooth device, but also effectively improves the overall audio quality of audio broadcasting.

Figure 5:
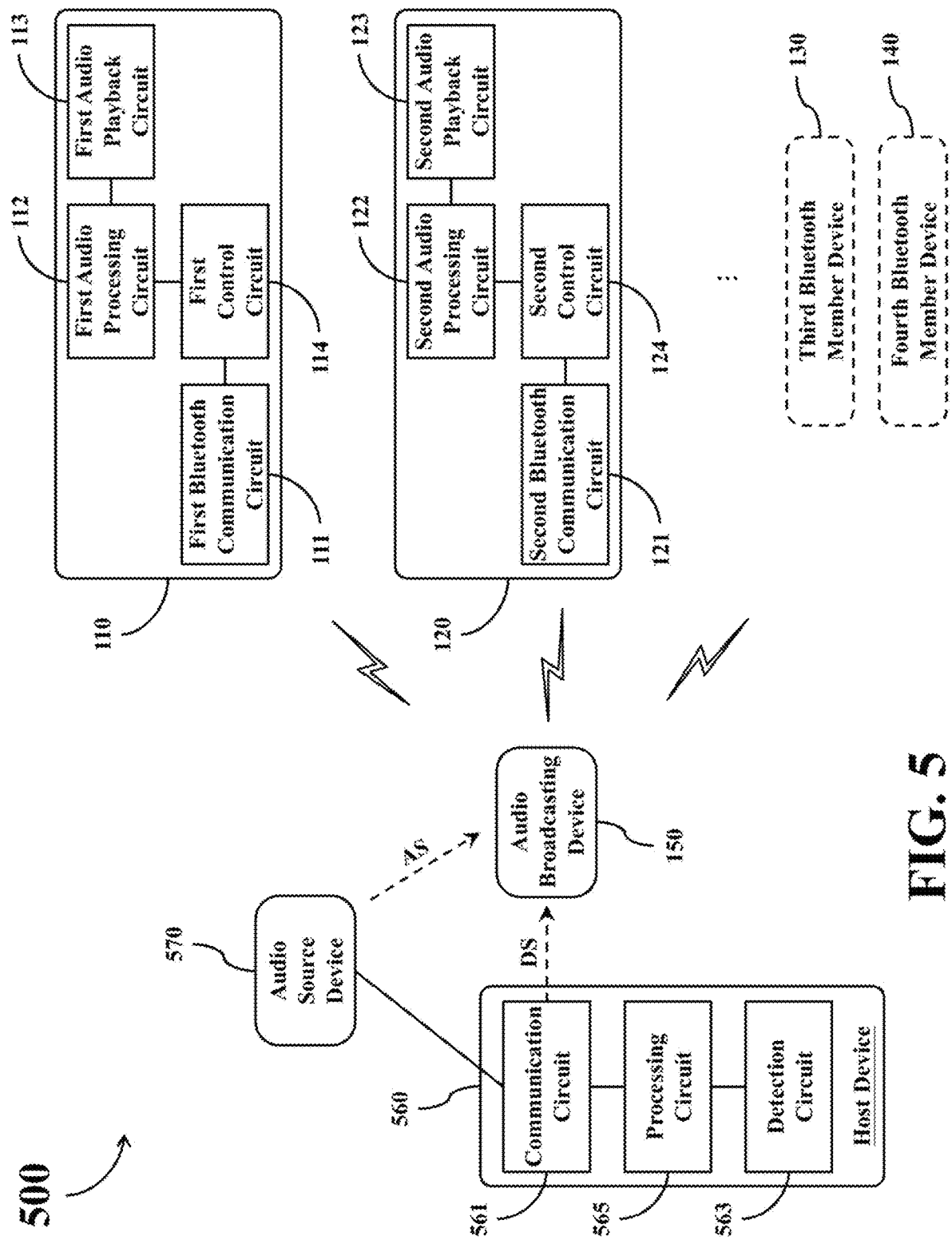
FIG. 5 shows a simplified functional block diagram of a Bluetooth audio broadcasting system according to a third embodiment of the present disclosure.

Please refer to FIG. 5, which shows a simplified functional block diagram of a Bluetooth audio broadcasting system 500 according to a third embodiment of the present disclosure. Similar to the Bluetooth audio broadcasting system 100 of FIG. 1, the Bluetooth audio broadcasting system 500 of FIG. 5 also comprises the audio broadcasting device 150 and multiple Bluetooth member devices (e.g., the aforementioned first Bluetooth member device 110, second Bluetooth member device 120, third Bluetooth member device 130, and fourth Bluetooth member device 140), and an audio source device 570. In addition, the Bluetooth audio broadcasting system 500 of FIG. 5 further comprises a host device 560.

In the Bluetooth audio broadcasting system 500, the host device 560 is arranged to operably detect alert signals or specific ambient sounds transmitted from the outside world, and to operably generate and transmit a detection signal DS to the audio broadcasting device 150.

As shown in FIG. 5, the host device 560 comprises a communication circuit 561, a detection circuit 563, and a processing circuit 565. The communication circuit 561 is arranged to operably conduct various data and command communications with the audio broadcasting device 150 and the audio source device 570 by utilizing various wired or wireless communication approaches. The detection circuit 563 is arranged to operably detect the alert signals (e.g., an earthquake warning message, a tsunami warning message, or the like) transmitted from the outside, or specific ambient sounds (e.g., an air raid alert, a fire alarm, an emergency broadcast, or an officials' voice broadcast, etc.). The processing circuit 565 is coupled with the communication circuit 561 and the detection circuit 563, and arranged to operably control the audio source device 570 through the communication circuit 561 or to operably receive command transmitted from the audio source device 570 through the communication circuit 561. The processing circuit 565 is further arranged to operably generate a detection signal DS when the aforementioned alert signal or specific ambient sound is detected by the detection circuit 563, and to operably utilize the communication circuit 561 to transmit the detection signal DS to the audio broadcasting device 150.

In practice, the communication circuit 561 may be realized with various wired transmission circuits, wireless transmission circuits, or hybrid circuits integrating the above two communication mechanisms. The detection circuit 563 may be realized with various appropriate sound capturing and recognition circuits (e.g., a cooperation of a microphone and a sound recognition circuit). The processing circuit 565 may be realized with a single processor module, a combination of multiple processor modules, a single computer system, a combination of multiple computer systems, a single server, or a combination of multiple servers having appropriate computing ability and command processing ability.

In practical applications, different functional blocks of the aforementioned the host device 560 may be realized with separate circuits or may be integrated into a mobile communication device (e.g., a mobile phone), a wearable device, a tablet computer, a laptop computer, a desktop computer, a vehicular communication system, a satellite communication device, a smart speaker, or a video conference system.

Similar to the embodiment of FIG. 4, the audio source device 570 of FIG. 5 may capture the user's voice to generate a corresponding audio signal AS and may utilize various wired or wireless transmission approaches to transmit the audio signal AS to the audio broadcasting device 150. The audio broadcasting device 150 in FIG. 5 is also arranged to operably convert the audio signal AS transmitted from the audio source device 570 into the predetermined audio data to be broadcasted. In other words, in the embodiment of FIG. 5, the contents of the predetermined audio data broadcasted by the audio broadcasting device 150 are originated from the audio source device 570.

However, a difference between the Bluetooth audio broadcasting system 400 of FIG. 4 and the Bluetooth audio broadcasting system 500 is that in the embodiment of FIG. 5, the detection signal DS is generated and transmitted to the audio broadcasting device 150 by the host device 560, instead of being generated by the audio source device 570.

In operations, the Bluetooth audio broadcasting system 500 in the embodiment of FIG. 5 can also adopt the approach described in the aforementioned FIG. 2 to conduct audio broadcasting. In addition, during the period at which the audio broadcasting device 150 conducts the audio broadcasting (i.e., during the period at which the audio broadcasting device 150 repeatedly performs the operation 222 and the operation 224 of FIG. 2), the detection circuit 563 would detect whether the host device 560 receives predetermined alert signals (e.g., an earthquake warning message, a tsunami warning message, or the like transmitted from a governmental department or other organizations through the telecommunication system or various wireless transmission mechanisms), or specific ambient sounds (e.g., an air raid alert, a fire alarm, an emergency broadcast, an officials' voice broadcast, etc.).

For example, the detection circuit 563 may detect whether any alert signal, such as an earthquake warning message or a tsunami warning message, transmitted from any governmental department or other organizations through the telecommunication system or various wireless transmission mechanisms is received by the host device 560.

For another example, the detection circuit 563 may capture the external sounds, and compare the captured sounds with one or more predetermined sound patterns (e.g., the sound patterns of an air raid alert, a tsunami alert, or a fire alarm) to determine whether specific ambient sounds, such as an air raid alert, a tsunami alert, or a fire alarm, occur in the surrounding environment of the host device 560.

For another example, the detection circuit 563 may capture the external sounds, and conduct voice content analysis and recognition operation on the captured sounds to determine whether specific ambient sounds, such as various emergency broadcasts or officials' voice broadcast, occur in the surrounding environment of the host device 560.

In this embodiment, the processing circuit 565 of the host device 560 may generate a corresponding detection signal DS when the aforementioned alert signal or specific ambient sound is detected by the detection circuit 563, and may utilize the communication circuit 561 to transmit the detection signal DS to the audio broadcasting device 150. The audio broadcasting device 150 may generate a corresponding target control command when receiving the detection signal DS transmitted from the host device 560, and then transmit the target control command to the first Bluetooth member device 110, the second Bluetooth member device 120, the third Bluetooth member device 130, and the fourth Bluetooth member device 140 to instruct the first Bluetooth member device 110, the second Bluetooth member device 120, the third Bluetooth member device 130, and the fourth Bluetooth member device 140 to reduce their audio volume to be lower than the predetermined threshold, so as to prevent the user from missing the alert signal or the specific ambient sounds transmitted from the outside world. As a result, this mechanism can prevent the user from unknowingly getting into a dangerous situation or missing important information from the outside world and delaying the timing of responding to the situation.

In the embodiment of FIG. 5, the audio broadcasting device 150 may perform the operation 302 and the operation 304 of FIG. 3 when receiving the detection signal DS generated by the host device 560, so as to transmit the target control command to the multiple Bluetooth member devices in the Bluetooth audio broadcasting system 500 (e.g., the aforementioned first Bluetooth member device 110, second Bluetooth member device 120, third Bluetooth member device 130, and fourth Bluetooth member device 140).

The foregoing descriptions regarding the implementations and connections of other circuits and devices in FIG. 1 or FIG. 4 are also applicable to the Bluetooth audio broadcasting system 500 of FIG. 5. The foregoing descriptions regarding the generation and transmission approaches of the predetermined data item and the target data item in FIG. 2 and FIG. 3 are also applicable to the Bluetooth audio broadcasting system 500 of FIG. 5. For the sake of brevity, the descriptions will not be repeated here.

Figure 6:
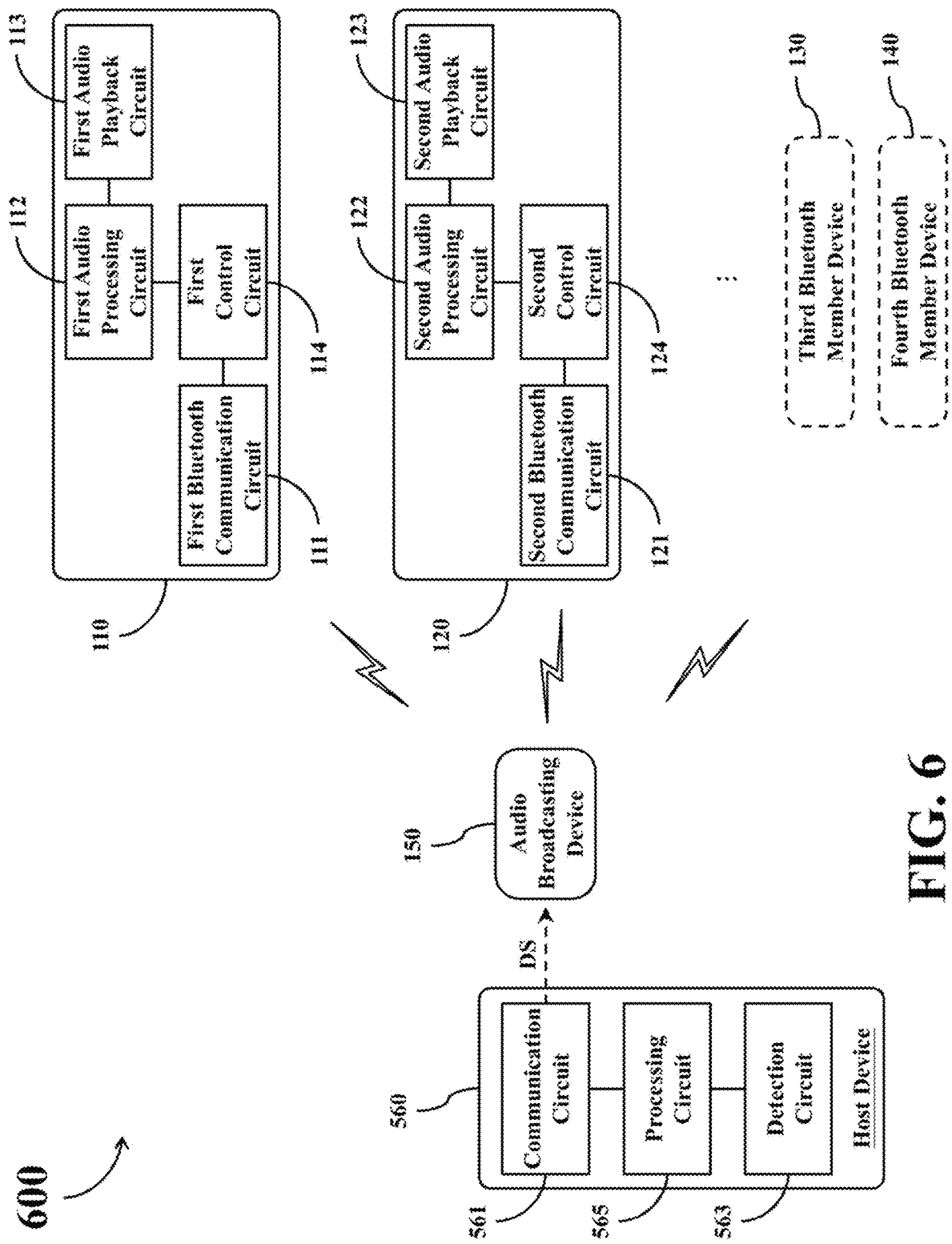
FIG. 6 shows a simplified functional block diagram of a Bluetooth audio broadcasting system according to a fourth embodiment of the present disclosure.

Please refer to FIG. 6, which shows a simplified functional block diagram of a Bluetooth audio broadcasting system 600 according to a fourth embodiment of the present disclosure. Similar to the Bluetooth audio broadcasting system 500 of FIG. 5, the Bluetooth audio broadcasting system 600 of FIG. 6 also comprises the audio broadcasting device 150, multiple Bluetooth member devices (e.g., the aforementioned first Bluetooth member device 110, second Bluetooth member device 120, third Bluetooth member device 130, and fourth Bluetooth member device 140), and the host device 560, but the aforementioned audio source device 570 is omitted in the Bluetooth audio broadcasting system 600 of FIG. 6.

In the embodiment of FIG. 6, the predetermined audio data to be broadcasted by the audio broadcasting device 150 may be the audio data prestored in the audio broadcasting device 150 or may be the audio data generated by the audio broadcasting device 150 according to the sound of the surroundings (e.g., the user's voice).

Similar to the embodiment of FIG. 5, the detection signal DS in the embodiment of FIG. 6 is also generated by the host device 560 and transmitted to the audio broadcasting device 150 by the host device 560.

In the embodiment of FIG. 6, the audio broadcasting device 150 may perform the operation 302 and the operation 304 of FIG. 3 when receiving the detection signal DS generated by the host device 560, so as to transmit the target control command to the multiple Bluetooth member devices in the Bluetooth audio broadcasting system 600 (e.g., the aforementioned first Bluetooth member device 110, second Bluetooth member device 120, third Bluetooth member device 130, and fourth Bluetooth member device 140).

The foregoing descriptions regarding the implementations and connections of other circuits and devices in FIG. 1, FIG. 4, or FIG. 5 are also applicable to the Bluetooth audio broadcasting system 600 of FIG. 6. The foregoing descriptions regarding the generation and transmission approaches of the predetermined data item and the target data item in FIG. 2 and FIG. 3 are also applicable to the Bluetooth audio broadcasting system 600 of FIG. 6. For the sake of brevity, the descriptions will not be repeated here.

As can be appreciated from the foregoing descriptions of FIG. 5 through FIG. 6, before the multi-member Bluetooth device in the Bluetooth audio broadcasting system 500 or 600 begins to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will also be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

Similarly, before beginning to playback the predetermined audio data transmitted from the audio broadcasting device 150, other Bluetooth member devices in the Bluetooth audio broadcasting system 500 or 600 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150. Therefore, when beginning to synchronously playback the predetermined audio data, the audio volume of other Bluetooth member devices in the Bluetooth audio broadcasting system 500 or 600 can make the user feel comfortable and will not cause discomfort or displeasure to the user.

In addition, during the period at which the multi-member Bluetooth device in the Bluetooth audio broadcasting system 500 or 600 playbacks the audio data broadcasted by the audio broadcasting device 150, the host device 560 may further utilize the detection signal DS to instruct the audio broadcasting device 150 to broadcast a target control command to respective Bluetooth member devices when the aforementioned alert signal or specific ambient sound is detected by the detection circuit 563, so as to synchronously reduce the audio volume of the respective Bluetooth member devices to be lower than the predetermined threshold. In other words, the disclosed Bluetooth audio broadcasting system 500 or 600 can synchronously reduce the audio volume of different Bluetooth member devices in the Bluetooth audio broadcasting system 500 or 600 to be lower than the predetermined threshold when the host device 560 receives the alert signal (e.g., the earthquake warning message, the tsunami warning message, or the like) or when specific ambient sounds (e.g., the air raid alert, the tsunami alert, the fire alarm, various emergency broadcast, or the officials' voice broadcast, etc.) occur in a surrounding environment of the host device 560, so as to avoid the user from getting into a dangerous situation or delaying the timing of responding to the situation due to missing the alert signal or specific ambient sounds transmitted from the external environment.

Moreover, the Bluetooth audio broadcasting system 500 or 600 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 500 or 600 not only reduces the power consumption of the multi-member Bluetooth device to thereby extend the serving time of the multi-member Bluetooth device, but also effectively improves the overall audio quality of audio broadcasting.

Figure 7:
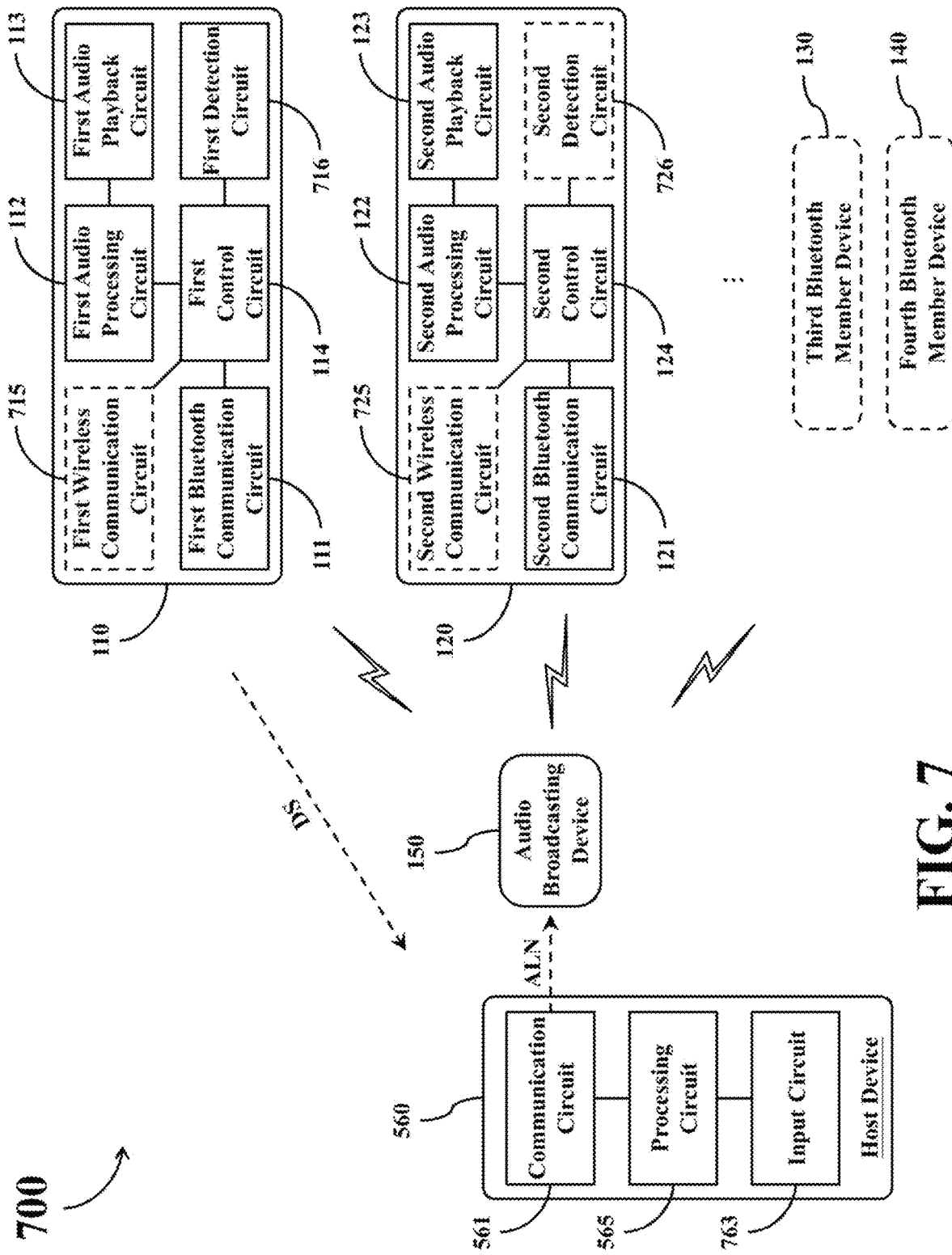
FIG. 7 shows a simplified functional block diagram of a Bluetooth audio broadcasting system according to a fifth embodiment of the present disclosure.

Please refer to FIG. 7, which shows a simplified functional block diagram of a Bluetooth audio broadcasting system 700 according to a fifth embodiment of the present disclosure. Similar to the Bluetooth audio broadcasting system 600 of FIG. 6, the Bluetooth audio broadcasting system 700 of FIG. 7 also comprises the audio broadcasting device 150, multiple Bluetooth member devices (e.g., the aforementioned first Bluetooth member device 110, second Bluetooth member device 120, third Bluetooth member device 130, and fourth Bluetooth member device 140), and the host device 560.

Different from the aforementioned embodiment of FIG. 6, a part of or all of the Bluetooth member devices in the Bluetooth audio broadcasting system 700 further comprise a detection circuit and a wireless communication circuit. For example, in the embodiment of FIG. 7, the first Bluetooth member device 110 further comprises a first wireless communication circuit 715 and a first detection circuit 716 in addition to the aforementioned first Bluetooth communication circuit 111, first audio processing circuit 112, first audio playback circuit 113, and first control circuit 114. Similarly, the second Bluetooth member device 10 further comprises a second wireless communication circuit 725 and a second detection circuit 726 in addition to the aforementioned second Bluetooth communication circuit 121, second audio processing circuit 122, second audio playback circuit 123, and second control circuit 124.

In the first Bluetooth member device 110, the first wireless communication circuit 715 is coupled with the first control circuit 114 and arranged to operably utilize various Radio Access technologies (RAT) except for the Bluetooth communication approach to conduct various data and/or command communication with the host device 560 under the control of the first control circuit 114. The first detection circuit 716 is coupled with the first control circuit 114 and arranged to operably detect the alert signals (e.g., an earthquake warning message, a tsunami warning message, or the like) transmitted from the outside, or specific ambient sounds (e.g., an air raid alert, a fire alarm, an emergency broadcast, or an officials' voice broadcast, etc.). The first control circuit 114 may generate a detection signal DS when the aforementioned alert signal or specific ambient sound is detected by the first detection circuit 716, and may utilize the first wireless communication circuit 715 to transmit the detection signal DS to the host device 560.

The aforementioned Radio Access technologies may be various infrared signal transmission technologies, the near field communication (NFC) technology, the 2nd Generation (2G) mobile communication technology, various 3rd Generation (3G) mobile communication technologies, various 4th Generation (4G) mobile communication technologies, various 5th Generation (5G) mobile communication technologies, various wireless network communication technologies specified by the IEEE 802.11 series, various Internet-of-Thing (IoT) communication technologies, various Narrow Band Internet of Thing (NB-IoT) communication technologies, various Vehicle-to-Vehicle communication technologies, various Vehicle-to-Everything (V2X) communication technologies, various satellite communication technologies, various wireless communication technologies set by other standard setting organizations, or the like.

In the second Bluetooth member device 120, the second wireless communication circuit 725 is coupled with the second control circuit 124 and arranged to operably utilize various Radio Access technologies (RAT) except for the Bluetooth communication approach to conduct various data and/or command communication with the host device 560 under the control of the second control circuit 124. The second detection circuit 726 is coupled with the second control circuit 124 and arranged to operably detect the alert signals (e.g., an earthquake warning message, a tsunami warning message, or the like) transmitted from the outside, or specific ambient sounds (e.g., an air raid alert, a fire alarm, an emergency broadcast, or an officials' voice broadcast, etc.). The second control circuit 124 may generate a detection signal DS when the aforementioned alert signal or specific ambient sound is detected by the second detection circuit 726, and may utilize the second wireless communication circuit 725 to transmit the detection signal DS to the host device 560.

In practice, the aforementioned first wireless communication circuit 715 and second wireless communication circuit 725 may be realized with various suitable circuits or chips supporting one or more types of the aforementioned Radio Access technologies. For example, each of the aforementioned first wireless communication circuit 715 and second wireless communication circuit 725 may be realized with an infrared signal transmission circuit, a near field communication (NFC) circuit, a Network Interface Card (NIC), a Wi-Fi circuit, a mobile communication circuit, a satellite communication circuit, an IoT communication circuit, or the like. The first wireless communication circuit 715 may be integrated with other functional blocks of the first Bluetooth member device 110 (e.g., the first Bluetooth communication circuit 111). Similarly, the second wireless communication circuit 725 may be integrated with other functional blocks of the second Bluetooth member device 120 (e.g., the second Bluetooth communication circuit 121).

Each of the first detection circuit 716 and the second detection circuit 726 may be realized with various appropriate sound capturing and recognition circuits (e.g., a cooperation of a microphone and a sound recognition circuit). The first detection circuit 716 may be configured outside of the first Bluetooth member device 110, or may be integrated with other functional blocks of the first Bluetooth member device 110. Similarly, the second detection circuit 726 may be configured outside of the second Bluetooth member device 120, or may be integrated with other functional blocks of the second Bluetooth member device 120.

Other Bluetooth member devices in the Bluetooth audio broadcasting system 700 may be provided with corresponding detection circuit and wireless communication circuit according to the aforementioned structure of the first Bluetooth member device 110 or second Bluetooth member device 120.

In the embodiment of FIG. 7, the host device 560 comprises the aforementioned communication circuit 561 and processing circuit 565 and an input circuit 763. The input circuit 763 is coupled with the processing circuit 565 and arranged to operably permit a user of the host device 560 to conduct various manipulations on the host device 560, such as inputting instruction, configuring volume adjusting direction, configuring volume adjusting amount, or the like. In practice, the input circuit 763 may be realized with a keyboard, a mouse, a remote control, a touch screen, a touch pad, a button, a resistive touch control circuit, a capacitive touch control circuit, a gyroscope, a voice activated input device, a gesture sensing device, a circuit adopting other command generating technologies, or a combination of the above devices.

In addition, the multiple Bluetooth member devices in the Bluetooth audio broadcasting system 700 (e.g., the aforementioned first Bluetooth member device 110, second Bluetooth member device 120, third Bluetooth member device 130, and fourth Bluetooth member device 140) may collectively form a multi-member Bluetooth device, such as a group of multi-channel Bluetooth speakers.

In operations, the Bluetooth audio broadcasting system 700 can also adopt the approach described in the aforementioned FIG. 2 to conduct audio broadcasting to the multi-member Bluetooth device.

In addition, during the period at which the audio broadcasting device 150 conducts the audio broadcasting (i.e., during the period at which the audio broadcasting device 150 repeatedly performs the operation 222 and the operation 224 of FIG. 2), the first detection circuit 716 may detect whether the first Bluetooth member device 110 receives predetermined alert signals (e.g., an earthquake warning message, a tsunami warning message, or the like transmitted from a governmental department or other organizations through the telecommunication system or various wireless transmission mechanisms), or specific ambient sounds (e.g., an air raid alert, a fire alarm, an emergency broadcast, an officials' voice broadcast, etc.).

For example, the first detection circuit 716 may detect whether any alert signal, such as an earthquake warning message or a tsunami warning message, transmitted from any governmental department or other organizations through the telecommunication system or various wireless transmission mechanisms is received by the first Bluetooth member device 110.

For another example, the first detection circuit 716 may capture the external sounds, and compare the captured sounds with one or more predetermined sound patterns (e.g., the sound patterns of an air raid alert, a tsunami alert, or a fire alarm) to determine whether specific ambient sounds, such as an air raid alert, a tsunami alert, or a fire alarm, occur in the surrounding environment of the first Bluetooth member device 110.

For another example, the first detection circuit 716 may capture the external sounds, and conduct voice content analysis and recognition operation on the captured sounds to determine whether specific ambient sounds, such as various emergency broadcasts or officials' voice broadcast, occur in the surrounding environment of the first Bluetooth member device 110.

When the aforementioned alert signal or specific ambient sound is detected by the first detection circuit 716, the first control circuit 114 of the first Bluetooth member device 110 may generate a corresponding detection signal DS, and utilize the first wireless communication circuit 715 to transmit the detection signal DS to the host device 560.

Similarly, the second detection circuit 726 may detect whether the second Bluetooth member device 120 receives predetermined alert signals (e.g., an earthquake warning message, a tsunami warning message, or the like transmitted from a governmental department or other organizations through the telecommunication system or various wireless transmission mechanisms), or specific ambient sounds (e.g., an air raid alert, a fire alarm, an emergency broadcast, an officials' voice broadcast, etc.).

For example, the second detection circuit 726 may detect whether any alert signal, such as an earthquake warning message or a tsunami warning message, transmitted from any governmental department or other organizations through the telecommunication system or various wireless transmission mechanisms is received by the second Bluetooth member device 120.

For another example, the second detection circuit 726 may capture the external sounds, and compare the captured sounds with one or more predetermined sound patterns (e.g., the sound patterns of an air raid alert, a tsunami alert, or a fire alarm) to determine whether specific ambient sounds, such as an air raid alert, a tsunami alert, or a fire alarm, occur in the surrounding environment of the second Bluetooth member device 120.

For another example, the second detection circuit 726 may capture the external sounds, and conduct voice content analysis and recognition operation on the captured sounds to determine whether specific ambient sounds, such as various emergency broadcasts or officials' voice broadcast, occur in the surrounding environment of the second Bluetooth member device 120.

When the aforementioned alert signal or specific ambient sound is detected by the second detection circuit 726, the second control circuit 124 of the second Bluetooth member device 120 may generate a corresponding detection signal DS, and utilize the second wireless communication circuit 725 to transmit the detection signal DS to the host device 560.

In the embodiment of FIG. 7, when the detection signal DS transmitted from the first Bluetooth member device 110 or the second Bluetooth member device 120 is received by the communication circuit 561 of the host device 560, the processing circuit 565 generates an alert notice ALN and utilize the communication circuit 561 to transmit the alert notice ALN to the audio broadcasting device 150. The audio broadcasting device 150 may generate a corresponding target control command when receiving the alert notice ALN transmitted from the host device 560, and then transmit the target control command to the first Bluetooth member device 110, the second Bluetooth member device 120, the third Bluetooth member device 130, and the fourth Bluetooth member device 140 to instruct the first Bluetooth member device 110, the second Bluetooth member device 120, the third Bluetooth member device 130, and the fourth Bluetooth member device 140 to reduce their audio volume to be lower than the predetermined threshold, so as to prevent the user from missing the alert signal or the specific ambient sounds transmitted from the outside world. As a result, this mechanism can prevent the user from unknowingly getting into a dangerous situation or missing important information from the outside world and delaying the timing of responding to the situation.

In the embodiment of FIG. 7, the audio broadcasting device 150 may perform the operation 302 and the operation 304 of FIG. 3 when receiving the alert notice ALN generated by the host device 560, so as to transmit the target control command to the multiple Bluetooth member devices in the Bluetooth audio broadcasting system 700 (e.g., the aforementioned first Bluetooth member device 110, second Bluetooth member device 120, third Bluetooth member device 130, and fourth Bluetooth member device 140).

The foregoing descriptions regarding the implementations and connections of other circuits and devices in FIG. 1, FIG. 4, FIG. 5, or FIG. 6 are also applicable to the Bluetooth audio broadcasting system 700 of FIG. 7. The foregoing descriptions regarding the generation and transmission approaches of the predetermined data item and the target data item in FIG. 2 and FIG. 3 are also applicable to the Bluetooth audio broadcasting system 700 of FIG. 7. For the sake of brevity, the descriptions will not be repeated here.

As can be appreciated from the foregoing descriptions, in the Bluetooth audio broadcasting system 700, the first Bluetooth member device 110 may utilize the first wireless communication circuit 715 to transmit a detection signal DS to the host device 560, and the second Bluetooth member device 120 may utilize the second wireless communication circuit 725 to transmit a detection signal DS to the host device 560. This is merely an exemplary embodiment, rather than a restriction to the practical implementations of the present disclosure. In practice, the first Bluetooth member device 110 or the second Bluetooth member device 120 may instead adopt other approaches to transmit the detection signal DS to the host device 560.

For example, in another embodiment, the first Bluetooth member device 110 may utilize the first Bluetooth communication circuit 111 to transmit the detection signal DS to the host device 560, and the second Bluetooth member device 120 may utilize the second Bluetooth communication circuit 121 to transmit the detection signal DS to the host device 560. In this situation, the aforementioned first wireless communication circuit 715 and/or second wireless communication circuit 725 may be omitted.

In addition, in some embodiments, the second detection circuit 726 of the second Bluetooth member device 120 of FIG. 7 may be omitted.

Figure 8:
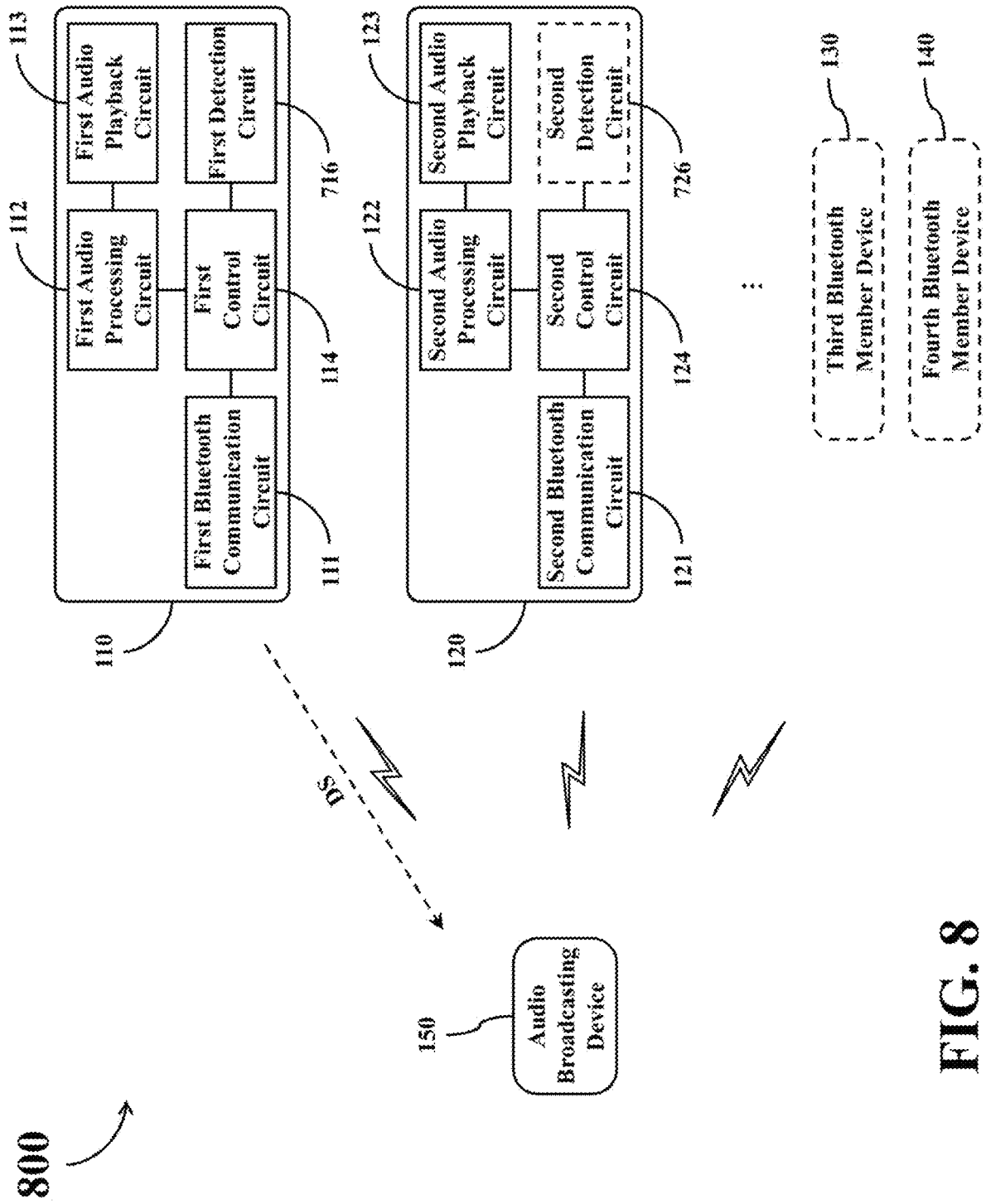
FIG. 8 shows a simplified functional block diagram of a Bluetooth audio broadcasting system according to a sixth embodiment of the present disclosure.

Please refer to FIG. 8, which shows a simplified functional block diagram of a Bluetooth audio broadcasting system 800 according to a sixth embodiment of the present disclosure. Similar to the Bluetooth audio broadcasting system 700 of FIG. 7, the Bluetooth audio broadcasting system 800 of FIG. 8 also comprises the audio broadcasting device 150 and multiple Bluetooth member devices (e.g., the aforementioned first Bluetooth member device 110, second Bluetooth member device 120, third Bluetooth member device 130, and fourth Bluetooth member device 140), but the aforementioned host device 560 is omitted in the Bluetooth audio broadcasting system 800 of FIG. 8.

In addition, slightly different from the aforementioned embodiment of FIG. 7, some or all of the Bluetooth member devices in the Bluetooth audio broadcasting system 800 of FIG. 8 further include a detection circuit, but the aforementioned wireless communication circuit is omitted. For example, in the embodiment of FIG. 8, the first Bluetooth member device 110 comprises the aforementioned first Bluetooth communication circuit 111, first audio processing circuit 112, first audio playback circuit 113, first control circuit 114, and first detection circuit 716, but omits the first wireless communication circuit 715. Similarly, the second Bluetooth member device 120 comprises the aforementioned second Bluetooth communication circuit 121, second audio processing circuit 122, second audio playback circuit 123, second control circuit 124, and second detection circuit 726, but omits the second wireless communication circuit 725.

Other Bluetooth member devices in the Bluetooth audio broadcasting system 800 of FIG. 8 may be provided with corresponding detection circuit according to the aforementioned structure of the first Bluetooth member device 110 or second Bluetooth member device 120.

In the embodiment of FIG. 8, the multiple Bluetooth member devices in the Bluetooth audio broadcasting system 800 (e.g., the aforementioned first Bluetooth member device 110, second Bluetooth member device 120, third Bluetooth member device 130, and fourth Bluetooth member device 140) may collectively form a multi-member Bluetooth device, such as a group of multi-channel Bluetooth speakers.

In operations, the Bluetooth audio broadcasting system 800 of FIG. 8 can also adopt the approach described in the aforementioned FIG. 2 to conduct audio broadcasting to the multi-member Bluetooth device.

In addition, during the period at which the audio broadcasting device 150 conducts the audio broadcasting (i.e., during the period at which the audio broadcasting device 150 repeatedly performs the operation 222 and the operation 224 of FIG. 2), the first detection circuit 716 may detect whether the first Bluetooth member device 110 receives predetermined alert signals (e.g., an earthquake warning message, a tsunami warning message, or the like transmitted from a governmental department or other organizations through the telecommunication system or various wireless transmission mechanisms), or specific ambient sounds (e.g., an air raid alert, a fire alarm, an emergency broadcast, an officials' voice broadcast, etc.). Similarly, the second detection circuit 726 may detect whether the second Bluetooth member device 120 receives predetermined alert signals (e.g., an earthquake warning message, a tsunami warning message, or the like transmitted from a governmental department or other organizations through the telecommunication system or various wireless transmission mechanisms), or specific ambient sounds (e.g., an air raid alert, a fire alarm, an emergency broadcast, an officials' voice broadcast, etc.).

The operations of the first detection circuit 716 and the second detection circuit 726 in the embodiment of FIG. 8 are respectively the same as the operations of the first detection circuit 716 and the second detection circuit 726 in the aforementioned FIG. 7.

When the aforementioned alert signal or specific ambient sound is detected by the first detection circuit 716, the first control circuit 114 of the first Bluetooth member device 110 may generate a corresponding detection signal DS, and utilize the first Bluetooth communication circuit 111 to transmit the detection signal DS to the audio broadcasting device 150. Similarly, when the aforementioned alert signal or specific ambient sound is detected by the second detection circuit 726, the second control circuit 124 of the second Bluetooth member device 120 may generate a corresponding detection signal DS, and utilize the second Bluetooth communication circuit 121 to transmit the detection signal DS to the audio broadcasting device 150.

When the detection signal DS transmitted from the first Bluetooth member device 110 or the second Bluetooth member device 120 is received by the audio broadcasting device 150 of FIG. 8, the audio broadcasting device 150 may perform the operation 302 and the operation 304 of aforementioned FIG. 3 to transmit the target control command to the multiple Bluetooth member devices in the Bluetooth audio broadcasting system 800 (e.g., the aforementioned first Bluetooth member device 110, second Bluetooth member device 120, third Bluetooth member device 130, and fourth Bluetooth member device 140).

The foregoing descriptions regarding the implementations and connections of other circuits and devices in FIG. 1, FIG. 4, FIG. 5, FIG. 6, or FIG. 7 are also applicable to the Bluetooth audio broadcasting system 800 of FIG. 8. The foregoing descriptions regarding the generation and transmission approaches of the predetermined data item and the target data item in FIG. 2 and FIG. 3 are also applicable to the Bluetooth audio broadcasting system 800 of FIG. 8. For the sake of brevity, the descriptions will not be repeated here.

In some embodiments, the second detection circuit 726 of the second Bluetooth member device 120 of FIG. 8 may be omitted.

As can be appreciated from the foregoing descriptions of FIG. 7 and FIG. 8, before the multi-member Bluetooth device in the Bluetooth audio broadcasting system 700 or 800 begins to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will also be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

Similarly, before beginning to playback the predetermined audio data transmitted from the audio broadcasting device 150, other Bluetooth member devices in the Bluetooth audio broadcasting system 700 or 800 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150. Therefore, when beginning to synchronously playback the predetermined audio data, the audio volume of other Bluetooth member devices in the Bluetooth audio broadcasting system 700 or 800 can make the user feel comfortable and will not cause discomfort or displeasure to the user.

In addition, during the period at which the multi-member Bluetooth device in the Bluetooth audio broadcasting system 700 or 800 playbacks the audio data broadcasted by the audio broadcasting device 150, the audio broadcasting device 150 may broadcast a target control command to respective Bluetooth member devices according to the alert notice ALN transmitted from the host device 560 or the detection signal DS transmitted from the first Bluetooth member device 110 and/or the second Bluetooth member device 120 when the aforementioned alert signal or specific ambient sound is detected by the first Bluetooth member device 110 or the second Bluetooth member device 120, so as to synchronously reduce the audio volume of the respective Bluetooth member devices to be lower than the predetermined threshold. In other words, the disclosed Bluetooth audio broadcasting system 700 or 800 can synchronously reduce the audio volume of different Bluetooth member devices in the Bluetooth audio broadcasting system 700 or 800 to be lower than the predetermined threshold when the first Bluetooth member device 110 or the second Bluetooth member device 120 receives the alert signal (e.g., the earthquake warning message, the tsunami warning message, or the like) or when specific ambient sounds (e.g., the air raid alert, the tsunami alert, the fire alarm, various emergency broadcast, or the officials' voice broadcast, etc.) occur in a surrounding environment of the first Bluetooth member device 110 or the second Bluetooth member device 120, so as to avoid the user from getting into a dangerous situation or delaying the timing of responding to the situation due to missing the alert signal or specific ambient sounds transmitted from the external environment.

Moreover, the Bluetooth audio broadcasting system 700 or 800 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 700 or 800 not only reduces the power consumption of the multi-member Bluetooth device to thereby extend the serving time of the multi-member Bluetooth device, but also effectively improves the overall audio quality of audio broadcasting.

Figure 9:
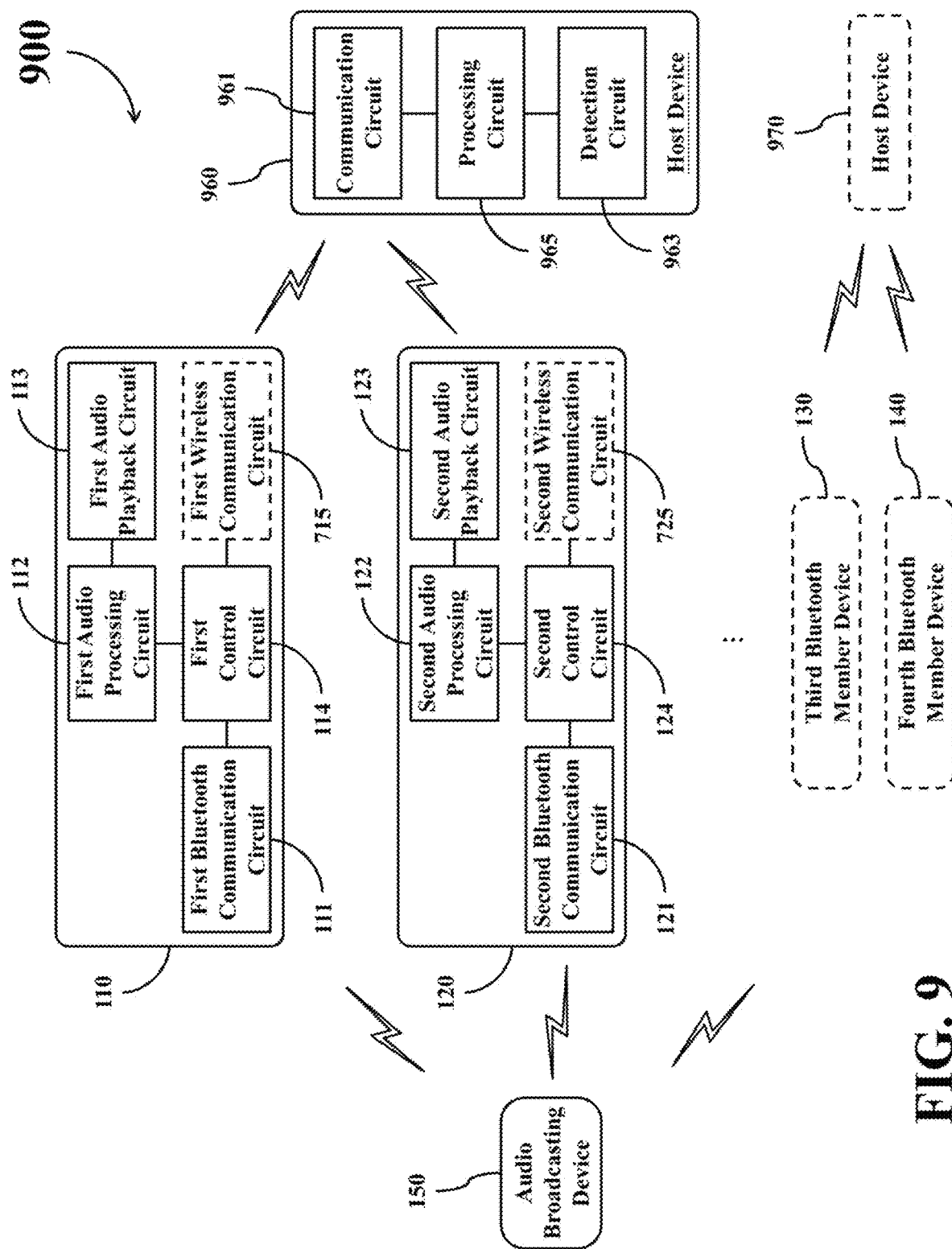
FIG. 9 shows a simplified functional block diagram of a Bluetooth audio broadcasting system according to a seventh embodiment of the present disclosure.

Please refer to FIG. 9, which shows a simplified functional block diagram of a Bluetooth audio broadcasting system 900 according to a seventh embodiment of the present disclosure.

In the embodiment of FIG. 9, the Bluetooth audio broadcasting system 900 comprises the audio broadcasting device 150, multiple Bluetooth member devices (e.g., the aforementioned first Bluetooth member device 110, second Bluetooth member device 120, third Bluetooth member device 130, and fourth Bluetooth member device 140), and one or more host devices. For the convenience of description, merely two exemplary host devices are shown in the embodiment of FIG. 9, which respectively are a host device 960 and a host device 970.

As shown in FIG. 9, the host device 960 comprises a communication circuit 961, a detection circuit 963, and a processing circuit 965. The communication circuit 961 is arranged to operably conduct various data and command communications with multiple Bluetooth member devices in the Bluetooth audio broadcasting system 900 by utilizing various wired or wireless communication approaches. The detection circuit 963 is arranged to operably detect the alert signals (e.g., an earthquake warning message, a tsunami warning message, or the like) transmitted from the outside, or specific ambient sounds (e.g., an air raid alert, a fire alarm, an emergency broadcast, or an officials' voice broadcast, etc.). The processing circuit 965 is coupled with the communication circuit 961 and the detection circuit 963, and arranged to operably generate a target control command when the aforementioned alert signal or specific ambient sound is detected by the detection circuit 963, and may utilize the communication circuit 961 to transmit the target control command to multiple Bluetooth member devices in the Bluetooth audio broadcasting system 900.

In practice, the communication circuit 961 may be realized with various wired transmission circuits, wireless transmission circuits, or hybrid circuits integrating the above two communication mechanisms. The detection circuit 963 may be realized with various appropriate sound capturing and recognition circuits (e.g., a cooperation of a microphone and a sound recognition circuit). The processing circuit 965 may be realized with a single processor module, a combination of multiple processor modules, a single computer system, a combination of multiple computer systems, a single server, or a combination of multiple servers having appropriate computing ability and command processing ability.

Additionally, in the embodiment of FIG. 9, the first Bluetooth member device 110 comprises the aforementioned first Bluetooth communication circuit 111, first audio processing circuit 112, first audio playback circuit 113, first control circuit 114, and the first wireless communication circuit 715. Similarly, the second Bluetooth member device 120 comprises the aforementioned second Bluetooth communication circuit 121, second audio processing circuit 122, second audio playback circuit 123, second control circuit 124, and second wireless communication circuit 725.

Similar to the embodiment of FIG. 7, the first wireless communication circuit 715 of FIG. 9 is coupled with the first control circuit 114 and arranged to operably utilize various Radio Access technologies (RAT) except for the Bluetooth communication approach to conduct various data and/or command communication with the communication circuit 961 of the host device 960 under the control of the first control circuit 114. Similarly, the second wireless communication circuit 725 is coupled with the second control circuit 124 and arranged to operably utilize various Radio Access technologies (RAT) except for the Bluetooth communication approach to conduct various data and/or command communication with the communication circuit 961 of the host device 960 under the control of the second control circuit 124.

Figure 10:
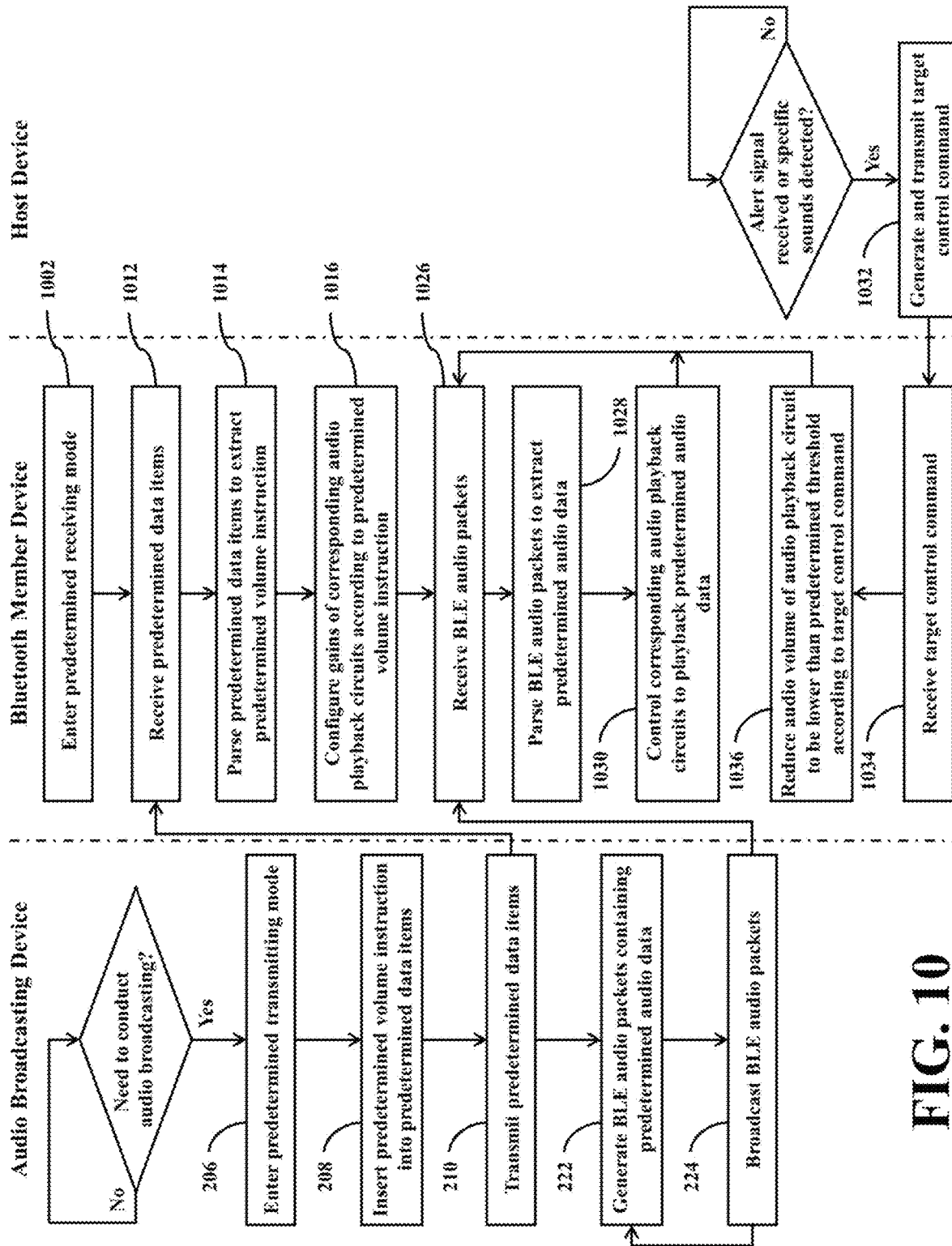
FIG. 10 shows a simplified flowchart of a method for conducting audio broadcasting by utilizing the BLE Audio technology according to a second embodiment of the present disclosure.

The operations of the Bluetooth audio broadcasting system 900 will be further described below by reference to FIG. 10. FIG. 10 shows a simplified flowchart of a method for conducting audio broadcasting by utilizing the BLE Audio technology according to a second embodiment of the present disclosure.

When the user wants to utilize the first Bluetooth member device 110 and the second Bluetooth member device 120 of the Bluetooth audio broadcasting system 900 to receive an audio broadcasting, the first Bluetooth member device 110 and the second Bluetooth member device 120 may perform the operation 1002 of FIG. 10. In this embodiment, the way the first Bluetooth member device 110 operates in the operation 1002 is substantially the same as the way the first Bluetooth member device 110 operates in the aforementioned operation 202 of FIG. 2, and the way the second Bluetooth member device 120 operates in the operation 1002 is substantially the same as the way the second Bluetooth member device 120 operates in the aforementioned operation 204 of FIG. 2.

As shown in FIG. 10, when the audio broadcasting device 150 needs to conduct the audio broadcasting, the audio broadcasting device 150 may perform the operation 206 through the operation 210 of FIG. 10. The operation 206 through the operation 210 of FIG. 10 conducted by the audio broadcasting device 150 are identical to the corresponding operations of aforementioned FIG. 2. That is, the audio broadcasting device 150 may insert a predetermined volume instruction corresponding to a predetermined volume into one or more predetermined data items. In addition, the audio broadcasting device 150 may transmit the aforementioned one or more predetermined data items under the predetermined transmitting mode, so that multiple Bluetooth member devices in the Bluetooth audio broadcasting system 900 (e.g., the first Bluetooth member device 110, the second Bluetooth member device 120, the third Bluetooth member device 130, and the fourth Bluetooth member device 140) can receive the aforementioned one or more predetermined data items.

Then, the first Bluetooth member device 110 and the second Bluetooth member device 120 may perform the operation 1012 and the operation 1014 of FIG. 10. In this embodiment, the operations of the first Bluetooth member device 110 in the operation 1012 and the operation 1014 are respectively the same as that in the aforementioned operation 212 and operation 214 of FIG. 2, and the operations of the second Bluetooth member device 120 in the operation 1012 and the operation 1014 are respectively the same as that in the aforementioned operation 212 and the operation 218 of FIG. 2.

Then, the first Bluetooth member device 110 and the second Bluetooth member device 120 may perform the operation 1016 of FIG. 10 to configure the gains of corresponding audio playback circuits according to the predetermined volume instruction transmitted from the audio broadcasting device 150. In this embodiment, the operations of the first Bluetooth member device 110 in the operation 1016 are substantially the same as that in the aforementioned operation 216 of FIG. 2, and the operations of the second Bluetooth member device 120 in the operation 1016 are substantially the same as that in the aforementioned operation 220 of FIG. 2.

For example, in the operation 1016, the first control circuit 114 may control the first audio processing circuit 112 to configure a gain of the first audio playback circuit 113 according to the predetermined volume instruction, so as to adjust the audio volume of the first audio playback circuit 113 to be close to or equal to the aforementioned predetermined volume in advance. Similarly, in the operation 1016, the second control circuit 124 may control the second audio processing circuit 122 to configure a gain of the second audio playback circuit 123 according to the predetermined volume instruction, so as to adjust the audio volume of the second audio playback circuit 123 to be close to or equal to the aforementioned predetermined volume in advance.

In other words, in this embodiment, before playbacking the audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

As shown in FIG. 10, after performing the operation 210, the audio broadcasting device 150 further performs the operation 222 and the operation 224. On the other hand, the first Bluetooth member device 110 and the second Bluetooth member device 120 may perform the operation 1026, the operation 1028, and the operation 1030 of FIG. 10. In this embodiment, the operations of the first Bluetooth member device 110 in the operation 1026, the operation 1028, and the operation 1030 are substantially the same as that in the aforementioned operation 226, operation 228, and operation 230 of FIG. 2, respectively. The operations of the second Bluetooth member device 120 in the operation 1026, the operation 1028, and the operation 1030 are substantially the same as that in the aforementioned operation 226, operation 232, and operation 234 of FIG. 2, respectively.

The audio broadcasting device 150 may repeatedly perform the operation 222 and the operation 224 of FIG. 10 to broadcast subsequent predetermined audio data. On the other hand, the first Bluetooth member device 110 and the second Bluetooth member device 120 may repeatedly perform the operation 1026, the operation 1028, and the operation 1030 to receive and playback the subsequent predetermined audio data.

As can be appreciated from the foregoing descriptions, the audio broadcasting device 150 of FIG. 9 may adopt the BLE Audio technology specified by the Bluetooth Core Specification Version 5.2 or newer versions to broadcast the predetermined audio data. In operations, the audio broadcasting device 150 may broadcast the BLE audio packets containing the predetermined audio data to multiple Bluetooth member devices in the Bluetooth audio broadcasting system 900 (e.g., the first Bluetooth member device 110, the second Bluetooth member device 120, the third Bluetooth member device 130, and the fourth Bluetooth member device 140) through the BIS logical transports.

During the period at which the audio broadcasting device 150 of FIG. 9 conducts the audio broadcasting (i.e., during the period at which the audio broadcasting device 150 repeatedly performs the operation 222 and the operation 224 of FIG. 10), the detection circuit 963 may detect whether the host device 960 receives predetermined alert signals (e.g., an earthquake warning message, a tsunami warning message, or the like transmitted from a governmental department or other organizations through the telecommunication system or various wireless transmission mechanisms), or specific ambient sounds (e.g., an air raid alert, a fire alarm, an emergency broadcast, an officials' voice broadcast, etc.).

For example, the detection circuit 963 may detect whether any alert signal, such as an earthquake warning message or a tsunami warning message, transmitted from any governmental department or other organizations through the telecommunication system or various wireless transmission mechanisms is received by the host device 960.

For another example, the detection circuit 963 may capture the external sounds, and compare the captured sounds with one or more predetermined sound patterns (e.g., the sound patterns of an air raid alert, a tsunami alert, or a fire alarm) to determine whether specific ambient sounds, such as an air raid alert, a tsunami alert, or a fire alarm, occur in the surrounding environment of the host device 960.

For another example, the detection circuit 963 may capture the external sounds, and conduct voice content analysis and recognition operation on the captured sounds to determine whether specific ambient sounds, such as various emergency broadcasts or officials' voice broadcast, occur in the surrounding environment of the host device 960.

In the embodiment of FIG. 9, the processing circuit 965 of the host device 960 may perform the operation 1032 of FIG. 10 when the aforementioned alert signal or specific ambient sound is detected by the detection circuit 963.

In the operation 1032, the processing circuit 965 may generate a corresponding target control command and utilize the communication circuit 961 to utilize various Radio Access technologies (RAT) except for the Bluetooth communication approach to transmit the target control command to the first wireless communication circuit 715 of the first Bluetooth member device 110 and the second wireless communication circuit 725 of the second Bluetooth member device 120 to instruct the first Bluetooth member device 110 and the second Bluetooth member device 120 to synchronously reduce the audio volume to be lower than the predetermined threshold.

In the operation 1034, the first wireless communication circuit 715 and the second wireless communication circuit 725 may receive the target control command transmitted from the host device 960.

Then, the first Bluetooth member device 110 and the second Bluetooth member device 120 may perform the operation 1036 to reduce the audio volume of corresponding audio playback circuits to be lower than the predetermined threshold according to the target control command transmitted from the host device 960. In this embodiment, the operations of the first Bluetooth member device 110 in the operation 1036 are substantially the same as that in the aforementioned operation 310 of FIG. 3, while the operations of the second Bluetooth member device 120 in the operation 1036 are substantially the same as that in the aforementioned operation 314 of FIG. 3.

For example, in the operation 1036, the first control circuit 114 may control the first audio processing circuit 112 to greatly reduce the gain of the first audio playback circuit 113 or to reduce the gain of the first audio playback circuit 113 to be lower than a predetermined level according to the target control command transmitted from the host device 960, so as to reduce the audio volume of the first audio playback circuit 113 to be lower than the predetermined threshold. Alternatively, the first control circuit 114 may control the first audio processing circuit 112 to switch the first audio playback circuit 113 to a mute mode, pause the audio playing operation of the first audio playback circuit 113, or stop the audio playing operation of the first audio playback circuit 113 according to the target control command.

Similarly, in the operation 1036, the second control circuit 124 may control the second audio processing circuit 122 to greatly reduce the gain of the second audio playback circuit 123 or to reduce the gain of the second audio playback circuit 123 to be lower than a predetermined level according to the target control command transmitted from the host device 960, so as to reduce the audio volume of the second audio playback circuit 123 to be lower than the predetermined threshold. Alternatively, the second control circuit 124 may control the second audio processing circuit 122 to switch the second audio playback circuit 123 to a mute mode, pause the audio playing operation of the second audio playback circuit 123, or stop the audio playing operation of the second audio playback circuit 123 according to the target control command.

Since the first Bluetooth member device 110 and the second Bluetooth member device 120 both adjust the audio volume according to the target control command transmitted from the host device 960, when the first audio processing circuit 112 reduces the audio volume of the first audio playback circuit 113 to be lower than the predetermined threshold, the second audio processing circuit 122 synchronously reduces the audio volume of the second audio playback circuit 123 to be lower than the predetermined threshold.

In other words, during the period at which the first Bluetooth member device 110 and the second Bluetooth member device 120 playback the audio data broadcasted by the audio broadcasting device 150, the host device 960 may generate and transmit a target control command to the first Bluetooth member device 110 and the second Bluetooth member device 120 when the aforementioned alert signal or specific ambient sound is detected by the detection circuit 963, so as to synchronously reduce the audio volume of the first Bluetooth member device 110 and the second Bluetooth member device 120 to be lower than the predetermined threshold.

In some embodiments where the first Bluetooth member device 110 and the second Bluetooth member device 120 are a pair of earphones with noise-cancelling capability, after the host device 960 utilizes the target control command to instruct the first Bluetooth member device 110 and the second Bluetooth member device 120 to reduce the audio volume to be lower than the predetermined threshold, the hose device 960 may further utilize the communication circuit 961 to transmit a mode-switching command to the first Bluetooth member device 110 and the second Bluetooth member device 120 to instruct the first Bluetooth member device 110 and the second Bluetooth member device 120 to switch from a noise cancellation mode to a transparency mode, so as to further increase the user's capability of receiving external sounds.

In the aforementioned Bluetooth audio broadcasting system 900, the communication circuit 961 of the host device 960 adopts various Radio Access technologies (RAT) except for the Bluetooth communication approach to transmit the target control command to the first wireless communication circuit 715 of the first Bluetooth member device 110 and the second wireless communication circuit 725 of the second Bluetooth member device 120. This is merely an exemplary embodiment, rather than a restriction to the practical implementations of the present disclosure. In practice, the communication circuit 961 of the host device 960 may adopt other transmission mechanism to transmit the target control command to the first Bluetooth member device 110 and the second Bluetooth member device 120.

For example, in another embodiment, the communication circuit 961 of the host device 960 may instead adopt the Bluetooth communication technology to transmit the target control command to the first Bluetooth communication circuit 111 of the first Bluetooth member device 110 and the second Bluetooth communication circuit 121 of the second Bluetooth member device 120. In this situation, the first Bluetooth member device 110 may utilize the first Bluetooth communication circuit 111 to receive the target control command transmitted from the host device 960, and the second Bluetooth member device 120 may utilize the second Bluetooth communication circuit 121 to receive the target control command transmitted from the host device 960. As a result, the first wireless communication circuit 715 and/or the second wireless communication circuit 725 of FIG. 9 may be omitted.

In some embodiments where the communication circuit 961 of the host device 960 utilizes the Bluetooth communication technology to transmit the target control command to the first Bluetooth member device 110 and the second Bluetooth member device 120, the processing circuit 965 of the host device 960 may insert the target control command into one or more target data items according to the aforementioned operation 302 of FIG. 3 performed by the audio broadcasting device 150.

For example, in some embodiments where the aforementioned target data items are various Bluetooth advertising packets, the processing circuit 965 may insert the aforementioned target control command into a single or multiple specific fields of a single Bluetooth advertising packet. Alternatively, the processing circuit 965 may insert the aforementioned target control command into specific fields of multiple Bluetooth advertising packets.

For another example, in some embodiments where the aforementioned target data items are various BIS PDUs or BIG PDUs, the processing circuit 965 may insert the aforementioned target control command into a single or multiple specific fields of a single BIS PDU or a single or multiple specific fields of a single BIG PDU, or may alternatively insert the above target control command into specific fields of multiple BIS PDUs or multiple BIG PDUs. As described previously, the aforementioned specific fields may be Event Counter fields, Sub-Event Counter fields, Payload Counter fields, or the like in the BIS PDUs or the BIG PDUs.

Then, the processing circuit 965 may control the communication circuit 961 to operate in a target transmitting mode according to the aforementioned operation 304 of FIG. 3 performed by the audio broadcasting device 150, so as to transmit the aforementioned one or more target data items to the first Bluetooth member device 110 and the second Bluetooth member device 120. The approach adopted by the communication circuit 961 for transmitting the aforementioned one or more target data items to the first Bluetooth member device 110 and the second Bluetooth member device 120 under the target transmitting mode are similar to the aforementioned operation 304 and operation 306 of FIG. 3. For the sake of brevity, the descriptions will not be repeated here.

In practical applications, the host device 960 may utilize the target control command to synchronously adjust the audio volume of other Bluetooth member devices in the Bluetooth audio broadcasting system 900 (e.g., the aforementioned third Bluetooth member device 130 and fourth Bluetooth member device 140) according to the aforementioned approaches of adjusting the audio volume of the first Bluetooth member device 110 or the second Bluetooth member device 120. But this is merely an exemplary embodiment, rather than a restriction to the practical implementations of the present disclosure.

In practice, the audio volume of other Bluetooth member devices in the Bluetooth audio broadcasting system 900 (e.g., the aforementioned third Bluetooth member device 130 and fourth Bluetooth member device 140) may instead be controlled by another host device (e.g., the host device 970). In this situation, the third Bluetooth member device 130 and the fourth Bluetooth member device 140 synchronously reduce their audio volume to be lower than the predetermined threshold according to the target control command generated by the host device 970.

Figure 11:
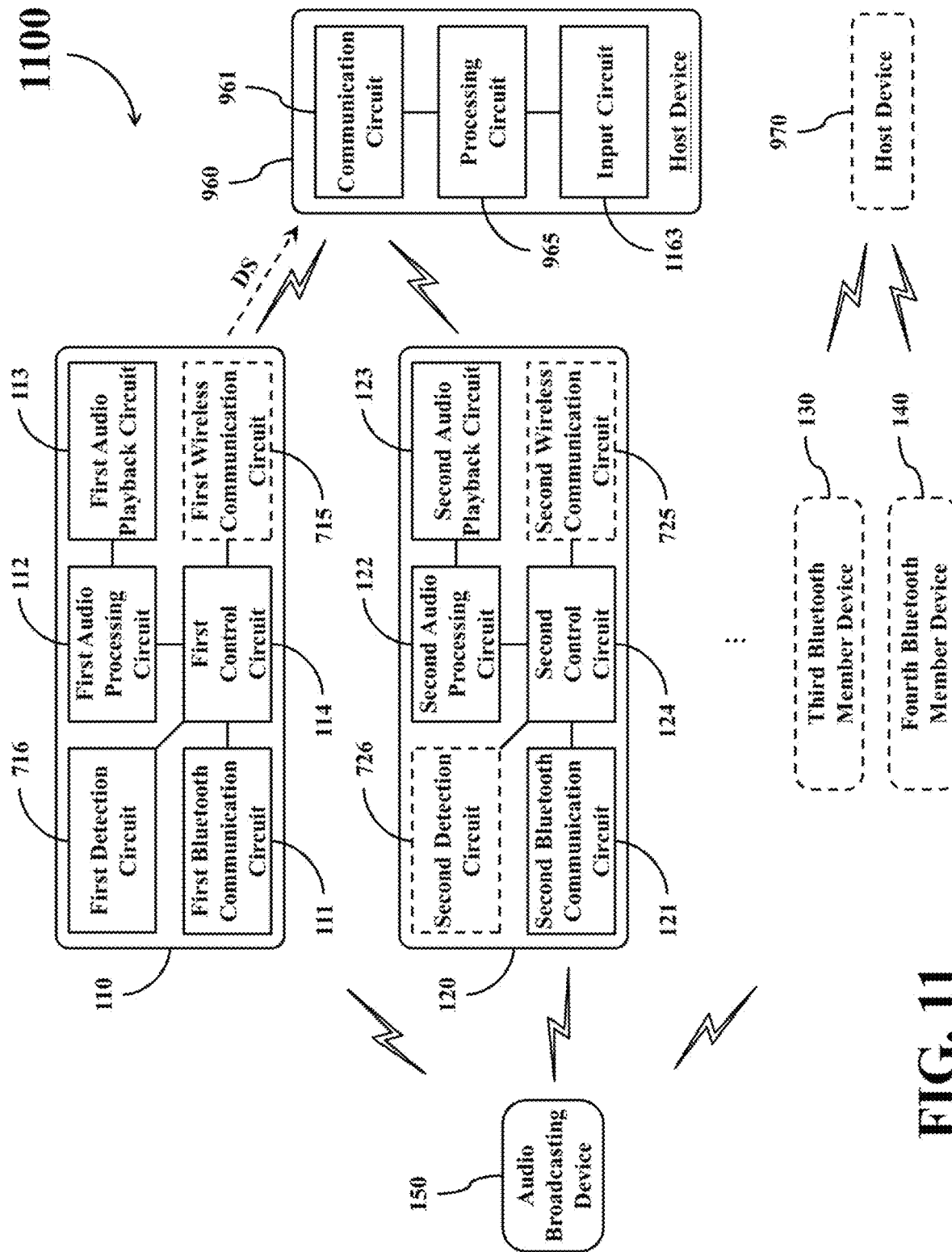
FIG. 11 shows a simplified functional block diagram of a Bluetooth audio broadcasting system according to an eighth embodiment of the present disclosure.

Please refer to FIG. 11, which shows a simplified functional block diagram of a Bluetooth audio broadcasting system 1100 according to an eighth embodiment of the present disclosure. Similar to the Bluetooth audio broadcasting system 900 of FIG. 9, the Bluetooth audio broadcasting system 1100 of FIG. 11 also comprises the audio broadcasting device 150, multiple Bluetooth member devices (e.g., the aforementioned first Bluetooth member device 110, second Bluetooth member device 120, third Bluetooth member device 130, and fourth Bluetooth member device 140), the host device 960, and the host device 970.

In comparison with the aforementioned embodiment of FIG. 9, a part of or all of the Bluetooth member devices in the Bluetooth audio broadcasting system 1100 of FIG. 11 further comprise a detection circuit. For example, in the embodiment of FIG. 11, the first Bluetooth member device 110 further comprises the first detection circuit 716 in addition to the aforementioned first Bluetooth communication circuit 111, first audio processing circuit 112, first audio playback circuit 113, first control circuit 114, and first wireless communication circuit 715. Similarly, the second Bluetooth member device 120 further comprises the second detection circuit 726 in addition to the aforementioned second Bluetooth communication circuit 121, second audio processing circuit 122, second audio playback circuit 123, second control circuit 124, and second wireless communication circuit 725.

In the first Bluetooth member device 110, the first detection circuit 716 is coupled with the first control circuit 114 and arranged to operably detect the alert signals (e.g., an earthquake warning message, a tsunami warning message, or the like) transmitted from the outside, or specific ambient sounds (e.g., an air raid alert, a fire alarm, an emergency broadcast, or an officials' voice broadcast, etc.). The first control circuit 114 may generate a detection signal DS when the aforementioned alert signal or specific ambient sound is detected by the first detection circuit 716, and may utilize the first wireless communication circuit 715 to transmit the detection signal DS to the host device 960.

In the second Bluetooth member device 120, the second detection circuit 726 is coupled with the second control circuit 124 and arranged to operably detect the alert signals (e.g., an earthquake warning message, a tsunami warning message, or the like) transmitted from the outside, or specific ambient sounds (e.g., an air raid alert, a fire alarm, an emergency broadcast, or an officials' voice broadcast, etc.). The second control circuit 124 may generate a detection signal DS when the aforementioned alert signal or specific ambient sound is detected by the second detection circuit 726, and may utilize the second wireless communication circuit 725 to transmit the detection signal DS to the host device 960.

As described previously, each of the first detection circuit 716 and the second detection circuit 726 may be realized with various appropriate sound capturing and recognition circuits (e.g., a cooperation of a microphone and a sound recognition circuit). The first detection circuit 716 may be configured outside of the first Bluetooth member device 110, or may be integrated with other functional blocks of the first Bluetooth member device 110. Similarly, the second detection circuit 726 may be configured outside of the second Bluetooth member device 120, or may be integrated with other functional blocks of the second Bluetooth member device 120.

Other Bluetooth member devices in the Bluetooth audio broadcasting system 1100 of FIG. 11 may be provided with corresponding detection circuit according to the aforementioned structure of the first Bluetooth member device 110 or second Bluetooth member device 120.

In the embodiment of FIG. 11, the host device 960 comprises the aforementioned communication circuit 961 and processing circuit 965 and an input circuit 1163. The input circuit 1163 is coupled with the processing circuit 965 and arranged to operably permit a user of the host device 960 to conduct various manipulations on the host device 960, such as inputting instruction, configuring volume adjusting direction, configuring volume adjusting amount, or the like. In practice, the input circuit 1163 may be realized with a keyboard, a mouse, a remote control, a touch screen, a touch pad, a button, a resistive touch control circuit, a capacitive touch control circuit, a gyroscope, a voice activated input device, a gesture sensing device, a circuit adopting other command generating technologies, or a combination of the above devices.

Figure 12:
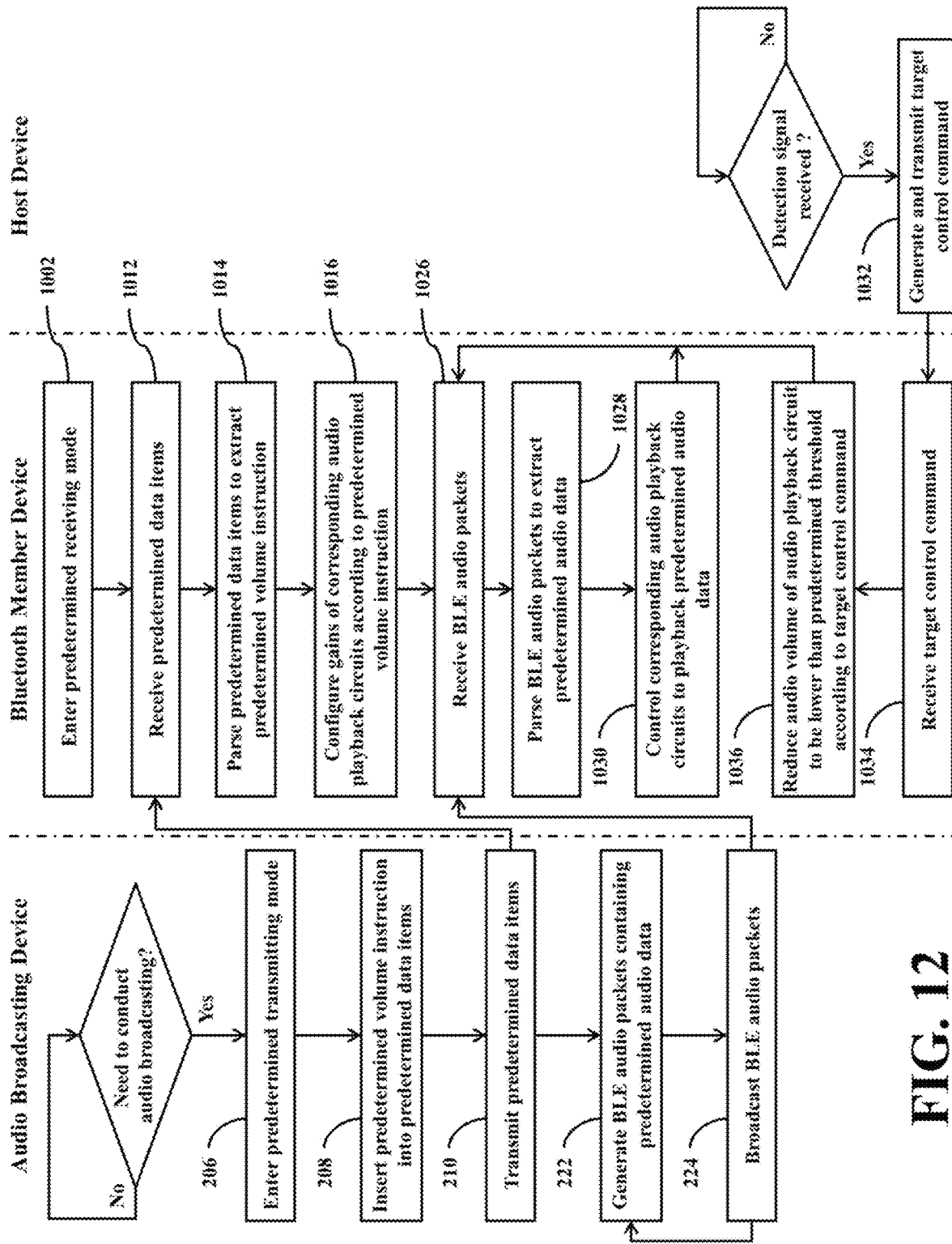
FIG. 12 shows a simplified flowchart of a method for conducting audio broadcasting by utilizing the BLE Audio technology according to a third embodiment of the present disclosure.

The operations of the Bluetooth audio broadcasting system 1100 will be further described below by reference to FIG. 12. FIG. 12 shows a simplified flowchart of a method for conducting audio broadcasting by utilizing the BLE Audio technology according to a third embodiment of the present disclosure.

In general, respective operations of FIG. 12 are identical to the corresponding operations of the aforementioned embodiment of FIG. 10. Therefore, the Bluetooth audio broadcasting system 1100 of FIG. 11 may conduct the audio broadcasting to multiple Bluetooth member devices according to the aforementioned approach of the Bluetooth audio broadcasting system 900 of FIG. 9.

However, during the period at which the audio broadcasting device 150 conducts the audio broadcasting (i.e., during the period at which the audio broadcasting device 150 repeatedly performs the operation 222 and the operation 224 of FIG. 12), the first detection circuit 716 may detect whether the first Bluetooth member device 110 receives predetermined alert signals (e.g., an earthquake warning message, a tsunami warning message, or the like transmitted from a governmental department or other organizations through the telecommunication system or various wireless transmission mechanisms), or specific ambient sounds (e.g., an air raid alert, a fire alarm, an emergency broadcast, an officials' voice broadcast, etc.).

For example, the first detection circuit 716 may detect whether any alert signal, such as an earthquake warning message or a tsunami warning message, transmitted from any governmental department or other organizations through the telecommunication system or various wireless transmission mechanisms is received by the first Bluetooth member device 110.

For another example, the first detection circuit 716 may capture the external sounds, and compare the captured sounds with one or more predetermined sound patterns (e.g., the sound patterns of an air raid alert, a tsunami alert, or a fire alarm) to determine whether specific ambient sounds, such as an air raid alert, a tsunami alert, or a fire alarm, occur in the surrounding environment of the first Bluetooth member device 110.

For another example, the first detection circuit 716 may capture the external sounds, and conduct voice content analysis and recognition operation on the captured sounds to determine whether specific ambient sounds, such as various emergency broadcasts or officials' voice broadcast, occur in the surrounding environment of the first Bluetooth member device 110.

When the aforementioned alert signal or specific ambient sound is detected by the first detection circuit 716, the first control circuit 114 of the first Bluetooth member device 110 may generate a corresponding detection signal DS, and utilize the first wireless communication circuit 715 to transmit the detection signal DS to the host device 960.

Similarly, the second detection circuit 726 may detect whether the second Bluetooth member device 120 receives predetermined alert signals (e.g., an earthquake warning message, a tsunami warning message, or the like transmitted from a governmental department or other organizations through the telecommunication system or various wireless transmission mechanisms), or specific ambient sounds (e.g., an air raid alert, a fire alarm, an emergency broadcast, an officials' voice broadcast, etc.).

For example, the second detection circuit 726 may detect whether any alert signal, such as an earthquake warning message or a tsunami warning message, transmitted from any governmental department or other organizations through the telecommunication system or various wireless transmission mechanisms is received by the second Bluetooth member device 120.

For another example, the second detection circuit 726 may capture the external sounds, and compare the captured sounds with one or more predetermined sound patterns (e.g., the sound patterns of an air raid alert, a tsunami alert, or a fire alarm) to determine whether specific ambient sounds, such as an air raid alert, a tsunami alert, or a fire alarm, occur in the surrounding environment of the second Bluetooth member device 120.

For another example, the second detection circuit 726 may capture the external sounds, and conduct voice content analysis and recognition operation on the captured sounds to determine whether specific ambient sounds, such as various emergency broadcasts or officials' voice broadcast, occur in the surrounding environment of the second Bluetooth member device 120.

When the aforementioned alert signal or specific ambient sound is detected by the second detection circuit 726, the second control circuit 124 of the second Bluetooth member device 120 may generate a corresponding detection signal DS, and utilize the second wireless communication circuit 725 to transmit the detection signal DS to the host device 960.

A difference between the embodiment of FIG. 10 and the embodiment of FIG. 12 is that the processing circuit 965 of the host device 960 perform the operation 1032 of FIG. 12 when the detection signal DS transmitted from the first Bluetooth member device 110 or the second Bluetooth member device 120 is received by the communication circuit 961 in the embodiment of FIG. 12.

In the operation 1032, the processing circuit 965 may generate a corresponding target control command and may utilize the communication circuit 961 to adopt various Radio Access technologies (RAT) except for the Bluetooth communication approach to transmit the target control command to the first wireless communication circuit 715 of the first Bluetooth member device 110 and the second wireless communication circuit 725 of the second Bluetooth member device 120 to instruct the first Bluetooth member device 110 and the second Bluetooth member device 120 to synchronously reduce the audio volume to be lower than the predetermined threshold.

In this situation, the first Bluetooth member device 110 and the second Bluetooth member device 120 of FIG. 11 may perform the aforementioned operation 1034 and operation 1036 to receive the target control command transmitted from the host device 960, and to reduce the audio volume of corresponding audio playback circuits to be lower than the predetermined threshold according to the target control command.

Since the first Bluetooth member device 110 and the second Bluetooth member device 120 both adjust the audio volume according to the target control command transmitted from the host device 960, when the first audio processing circuit 112 reduces the audio volume of the first audio playback circuit 113 to be lower than the predetermined threshold, the second audio processing circuit 122 synchronously reduces the audio volume of the second audio playback circuit 123 to be lower than the predetermined threshold.

In other words, during the period at which the first Bluetooth member device 110 and the second Bluetooth member device 120 playback the audio data broadcasted by the audio broadcasting device 150, the host device 960 may generate and transmit a target control command to the first Bluetooth member device 110 and the second Bluetooth member device 120 when the aforementioned alert signal or specific ambient sound is detected by the first Bluetooth member device 110 or the second Bluetooth member device 120, so as to synchronously reduce the audio volume of the first Bluetooth member device 110 and the second Bluetooth member device 120 to be lower than the predetermined threshold.

In some embodiments where the first Bluetooth member device 110 and the second Bluetooth member device 120 are a pair of earphones with noise-cancelling capability, after the host device 960 utilizes the target control command to instruct the first Bluetooth member device 110 and the second Bluetooth member device 120 to reduce the audio volume to be lower than the predetermined threshold, the hose device 960 may further utilize the communication circuit 961 to transmit a mode-switching command to the first Bluetooth member device 110 and the second Bluetooth member device 120 to instruct the first Bluetooth member device 110 and the second Bluetooth member device 120 to switch from a noise cancellation mode to a transparency mode, so as to further increase the user's capability of receiving external sounds.

Similar to the embodiment of FIG. 9, the communication circuit 961 of the host device 960 in FIG. 11 may instead adopt the Bluetooth communication technology to transmit the target control command to the first Bluetooth communication circuit 111 of the first Bluetooth member device 110 and the second Bluetooth communication circuit 121 of the second Bluetooth member device 120. In this situation, the first Bluetooth member device 110 may utilize the first Bluetooth communication circuit 111 to receive the target control command transmitted from the host device 960, and the second Bluetooth member device 120 may utilize the second Bluetooth communication circuit 121 to receive the target control command transmitted from the host device 960. As a result, the first wireless communication circuit 715 and/or the second wireless communication circuit 725 of FIG. 11 may be omitted.

In some embodiments, the second detection circuit 726 of the second Bluetooth member device 120 of FIG. 11 may be omitted.

In some embodiments where the communication circuit 961 of the host device 960 utilizes the Bluetooth communication technology to transmit the target control command to the first Bluetooth member device 110 and the second Bluetooth member device 120, the processing circuit 965 of the host device 960 may insert the target control command into one or more target data items according to the aforementioned operation 302 of FIG. 3 performed by the audio broadcasting device 150. In addition, the processing circuit 965 may control the communication circuit 961 to operate in a target transmitting mode according to the aforementioned operation 304 of FIG. 3 performed by the audio broadcasting device 150, so as to transmit the aforementioned one or more target data items to the first Bluetooth member device 110 and the second Bluetooth member device 120. The approach adopted by the communication circuit 961 for transmitting the aforementioned one or more target data items to the first Bluetooth member device 110 and the second Bluetooth member device 120 under the target transmitting mode are similar to the aforementioned operation 304 and operation 306 of FIG. 3. For the sake of brevity, the descriptions will not be repeated here.

In practical applications, the host device 960 of FIG. 11 may utilize the target control command to synchronously adjust the audio volume of other Bluetooth member devices in the Bluetooth audio broadcasting system 1100 (e.g., the aforementioned third Bluetooth member device 130 and fourth Bluetooth member device 140) according to the aforementioned approaches of adjusting the audio volume of the first Bluetooth member device 110 or the second Bluetooth member device 120. But this is merely an exemplary embodiment, rather than a restriction to the practical implementations of the present disclosure.

In practice, the audio volume of other Bluetooth member devices in the Bluetooth audio broadcasting system 1100 (e.g., the aforementioned third Bluetooth member device 130 and fourth Bluetooth member device 140) may instead be controlled by another host device (e.g., the host device 970). In this situation, the third Bluetooth member device 130 and the fourth Bluetooth member device 140 synchronously reduce their audio volume to be lower than the predetermined threshold according to the target control command generated by the host device 970.

The foregoing descriptions and connections regarding the related circuits and devices of FIG. 9 are also applicable to the Bluetooth audio broadcasting system 1100 of FIG. 11. In addition, since respective operations of FIG. 12 are basically the same as the corresponding operations of the aforementioned embodiment of FIG. 10, the foregoing descriptions regarding the operations of FIG. 10 are also applicable to the embodiment of FIG. 12. For the sake of brevity, the descriptions will not be repeated here.

As can be appreciated from the foregoing descriptions of FIG. 9 through FIG. 12, before the multi-member Bluetooth device in the Bluetooth audio broadcasting system 900 or 1100 begins to playback the predetermined audio data transmitted from the audio broadcasting device 150, the first Bluetooth member device 110 and the second Bluetooth member device 120 will first respectively adjust the audio volume of the first audio playback circuit 113 and the second audio playback circuit 123 to be close to or equal to the aforementioned predetermined volume according to the predetermined volume instruction transmitted from the audio broadcasting device 150.

Therefore, when the first Bluetooth member device 110 begins to utilize the first audio playback circuit 113 to playback the predetermined audio data transmitted from the audio broadcasting device 150, the audio volume generated by the first audio playback circuit 113 will be close to or equal to the aforementioned predetermined volume. Similarly, when the second Bluetooth member device 120 begins to utilize the second audio playback circuit 123 to playback the predetermined audio data transmitted from the audio broadcasting device 150, the audio volume generated by the second audio playback circuit 123 will also be close to or equal to the aforementioned predetermined volume.

As a result, when beginning to synchronously playback the predetermined audio data, the audio volume of the first audio playback circuit 113 and the second audio playback circuit 123 can make the user feel comfortable and will not cause discomfort or displeasure to the user.

In addition, since the audio volume of the first audio playback circuit 113 and the second audio playback circuit 123 has been configured to be close to or equal to the aforementioned predetermined volume in advance before the first audio playback circuit 113 and the second audio playback circuit 123 begin to synchronously playback the predetermined audio data, even if the audio broadcasting device 150 begins the audio broadcasting when the user has no psychological expectations, it can prevent the user from being frightened by receiving sudden and loud audio broadcasting.

Similarly, before beginning to playback the predetermined audio data transmitted from the audio broadcasting device 150, other Bluetooth member devices in the Bluetooth audio broadcasting system 900 or 1100 (e.g., the aforementioned third Bluetooth member device 130 and fourth Bluetooth member device 140) will first respectively adjust the audio volume of the related audio playback circuits (not shown in the figures) to be close to or equal to the aforementioned predetermined volume according to the predetermined volume instruction transmitted from the audio broadcasting device 150. Therefore, when beginning to synchronously playback the predetermined audio data, the audio volume of other Bluetooth member devices in the Bluetooth audio broadcasting system 900 or 1100 can make the user feel comfortable and will not cause discomfort or displeasure to the user.

In addition, during the period at which the multi-member Bluetooth device in the Bluetooth audio broadcasting system 900 or 1100 playbacks the audio data broadcasted by the audio broadcasting device 150, the host device 960 may generate and transmit a target control command to respective Bluetooth member devices (e.g., the aforementioned first Bluetooth member device 110 and second Bluetooth member device 120) when the aforementioned alert signal or specific ambient sound is detected by the detection circuit 963, the first Bluetooth member device 110, and/or the second Bluetooth member device 120, so as to synchronously reduce the audio volume of the respective Bluetooth member devices to be lower than the predetermined threshold. In other words, the disclosed Bluetooth audio broadcasting system 900 or 1100 can synchronously reduce the audio volume of different Bluetooth member devices in the Bluetooth audio broadcasting system 900 or 1100 to be lower than the predetermined threshold when the host device 960, the first Bluetooth member device 110, or the second Bluetooth member device 120 receives the alert signal (e.g., the earthquake warning message, the tsunami warning message, or the like) or when specific ambient sounds (e.g., the air raid alert, the tsunami alert, the fire alarm, various emergency broadcast, or the officials' voice broadcast, etc.) occur in a surrounding environment of the host device 960, the first Bluetooth member device 110, or the second Bluetooth member device 120, so as to avoid the user from getting into a dangerous situation or delaying the timing of responding to the situation due to missing the alert signal or specific ambient sounds transmitted from the external environment.

Moreover, the Bluetooth audio broadcasting system 900 or 1100 conducts audio broadcasting by adopting the BLE Audio technology, and the audio broadcasting device 150 utilizes the Low Complexity Communication Codec (LC3) to encode the predetermined audio data. Therefore, in comparison with the traditional audio broadcasting approaches, the aforementioned audio broadcasting approach adopted by the Bluetooth audio broadcasting system 900 or 1100 not only reduces the power consumption of the multi-member Bluetooth device to thereby extend the serving time of the multi-member Bluetooth device, but also effectively improves the overall audio quality of audio broadcasting.

Please note that the aforementioned executing order of the operations in each flowchart is merely an exemplary embodiment, rather than a restriction to the practical implementations of the present disclosure.

For example, the operation 206 of FIG. 2 may be performed before the operation 202 and/or operation 204, or may be performed at the same time with the operation 202 or operation 204.

For another example, the operation 206 of FIG. 10 and/or FIG. 12 may be performed before the operation 1002, or may be performed at the same time with the operation 1002.

For yet another example, the operation 222 of FIG. 2, FIG. 10, and/or FIG. 12 may be performed before the operation 208 and/or the operation 210, or may be performed at the same time with the operation 208 or the operation 210.

For yet another example, in some embodiments, the operation 208 through the operation 220 of FIG. 2 may be omitted.

For yet another example, in some embodiments, the operation 208, the operation 210, the operation 1012, the operation 1014, and the operation 1016 of FIG. 10 and FIG. 12 may be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A Bluetooth audio broadcasting system (900) comprising:
- an audio broadcasting device (150) arranged to operably broadcast one or more Bluetooth LE (BLE) audio packets through one or more Broadcast Isochronous Stream (BIS) logical transports in one or more Broadcast Isochronous Groups (BIG);
- a first Bluetooth member device (110) comprising:
  - a first Bluetooth communication circuit (111) arranged to operably receive the one or more Bluetooth LE audio packets;
  - a first audio processing circuit (112); and
  - a first control circuit (114), coupled with the first Bluetooth communication circuit (111) and the first audio processing circuit (112), and arranged to operably parse the one or more BLE audio packets received by the first Bluetooth communication circuit (111) to acquire a predetermined audio data, and to operably instruct the first audio processing circuit (112) to control a first audio playback circuit (113) to playback the predetermined audio data;
- a second Bluetooth member device (120) comprising:
  - a second Bluetooth communication circuit (121) arranged to operably receive the one or more Bluetooth LE audio packets;
  - a second audio processing circuit (122); and
  - a second control circuit (124), coupled with the second Bluetooth communication circuit (121) and the second audio processing circuit (122), and arranged to operably parse the one or more BLE audio packets received by the second Bluetooth communication circuit (121) to acquire the predetermined audio data, and to operably instruct the second audio processing circuit (122) to control a second audio playback circuit (123) to playback the predetermined audio data; and
- a host device (960) arranged to operably generate and transmit a target control command to the first Bluetooth member device (110) and the second Bluetooth member device (120) when the host device (960) receives an alert signal, or when a specific ambient sound occurs in a surrounding environment of the host device (960);
- wherein the first Bluetooth communication circuit (111) is further arranged to operably receive the target control command, and the first control circuit (114) is further arranged to operably control the first audio processing circuit (112) to reduce an audio volume of the first audio playback circuit (113) to be lower than a predetermined threshold according to the target control command;
- wherein the second Bluetooth communication circuit (121) is further arranged to operably receive the target control command, and the second control circuit (124) is further arranged to operably control the second audio processing circuit (122) to reduce an audio volume of the second audio playback circuit (123) to be lower than the predetermined threshold according to the target control command.

2. The Bluetooth audio broadcasting system (900) of claim 1, wherein the host device (960) comprises:
- a communication circuit (961) arranged to operably transmit the target control command to the first Bluetooth member device (110) and the second Bluetooth member device (120);
- a detection circuit (963) arranged to operably detect an alert signal transmitted from the outside or to detect specific ambient sounds; and
- a processing circuit (965) coupled with the communication circuit (961) and the detection circuit (963);
- wherein the processing circuit (965) generates the target control command when the detection circuit (963) detects the alert signal or the specific ambient sounds.

3. The Bluetooth audio broadcasting system (900) of claim 2, wherein the target control command is utilized for instructing the first Bluetooth member device (110) and the second Bluetooth member device (120) to respectively reduce the audio volume of the first audio playback circuit (113) and the second audio playback circuit (123) to be lower than the predetermined threshold.

4. The Bluetooth audio broadcasting system (900) of claim 2, wherein the target control command is a mute command, a pause command, or a stop command.

5. The Bluetooth audio broadcasting system (900) of claim 2, wherein the processing circuit (965) is further arranged to operably insert the target control command into one or more target data items, and to operably transmit the one or more target data items;
- wherein the first Bluetooth communication circuit (111) is further arranged to operably receive the one or more target data items, and the first control circuit (114) is further arranged to operably parse the one or more target data items to acquire the target control command, and to operably control the first audio processing circuit (112) to reduce the audio volume of the first audio playback circuit (113) to be lower than the predetermined threshold according to the target control command;
- wherein the second Bluetooth communication circuit (121) is further arranged to operably receive the one or more target data items, and the second control circuit (124) is further arranged to operably parse the one or more target data items to acquire the target control command, and to operably control the second audio processing circuit (122) to reduce the audio volume of the second audio playback circuit (123) to be lower than the predetermined threshold according to the target control command.

6. The Bluetooth audio broadcasting system (900) of claim 5, wherein the one or more target data items are selected from a group consisting of following items:
- one or more advertising indication (ADV_IND) packets;
- one or more non-connectable advertising indication (ADV_NONCONN_IND) packets;
- one or more discoverable advertisement indication (ADV_DISCOVER_IND) packets;
- one or more Broadcast Isochronous Stream (BIS) protocol data units; and
- one or more Broadcast Isochronous Group (BIG) protocol data units.

7. The Bluetooth audio broadcasting system (900) of claim 5, wherein the one or more target data items are selected from a group consisting of following items:
- one or more auxiliary advertising indication (AUX_ADV_IND) packets;
- one or more extended advertising indication (ADV_EXT_IND) packets;
- one or more auxiliary chain indication (AUX_CHAIN_IND) packets;
- one or more auxiliary scan response (AUX_SCAN_RSP) packets;

one or more auxiliary synchronous indication (AUX_SYNC_IND) packets;
one or more BIS protocol data units; and
one or more BIG protocol data units.

8. The Bluetooth audio broadcasting system (900) of claim 5, wherein the one or more target data items are selected from a group consisting of following items:
one or more advertising indication (ADV_IND) packets;
one or more non-connectable advertising indication (ADV_NONCONN_IND) packets;
one or more discoverable advertisement indication (ADV_DISCOVER_IND) packets;
one or more auxiliary advertising indication (AUX_ADV_IND) packets;
one or more extended advertising indication (ADV_EXT_IND) packets;
one or more auxiliary chain indication (AUX_CHAIN_IND) packets;
one or more auxiliary scan response (AUX_SCAN_RSP) packets;
one or more auxiliary synchronous indication (AUX_SYNC_IND) packets;
one or more BIS protocol data units; and
one or more BIG protocol data units.

9. The Bluetooth audio broadcasting system (900) of claim 2, wherein the audio broadcasting device (150) is further arranged to operably transmit a predetermined volume instruction to the first Bluetooth member device (110) and the second Bluetooth member device (120) before broadcasting the one or more BLE audio packets;

wherein the first Bluetooth communication circuit (111) is further arranged to operably receive the predetermined volume instruction, and the first control circuit (114) is further arranged to operably control the first audio processing circuit (112) to configure the audio volume of the first audio playback circuit (113) in advance according to the predetermined volume instruction;

wherein the second Bluetooth communication circuit (121) is further arranged to operably receive the predetermined volume instruction, and the second control circuit (124) is further arranged to operably control the second audio processing circuit (122) to configure the audio volume of the second audio playback circuit (123) in advance according to the predetermined volume instruction.

* * * * *